United States Patent [19]
Maeda et al.

[11] Patent Number: 5,315,571
[45] Date of Patent: May 24, 1994

[54] INFORMATION RECORDING AND REPRODUCING DEVICE PROVIDING FASTER ACCESS TIME TO A RECORDING MEDIUM

[75] Inventors: Shigemi Maeda, Yamatokoriyama; Kunio Kojima, Nara; Jun Akiyama, Kashihara; Shigeo Terashima; Tomiyuki Numata, both of Tenri, all of Japan

[73] Assignee: Sharp Kabushiki Kaisha, Osaka, Japan

[21] Appl. No.: 100,077

[22] Filed: Jul. 29, 1993

Related U.S. Application Data

[63] Continuation of Ser. No. 788,999, Nov. 7, 1991, abandoned.

[30] Foreign Application Priority Data

Nov. 9, 1990 [JP] Japan .................. 2-305486
Dec. 14, 1990 [JP] Japan .................. 2-402487

[51] Int. Cl.⁵ .............................................. G11B 7/00
[52] U.S. Cl. ........................... 369/50; 369/44.28; 369/44.26; 369/47
[58] Field of Search ............ 369/50, 47, 48, 51, 369/59, 54, 44.26, 44.27, 44.28, 44.29, 32

[56] References Cited
U.S. PATENT DOCUMENTS

| | | | |
|---|---|---|---|
| 4,611,319 | 9/1986 | Naito | 369/50 |
| 4,907,216 | 3/1990 | Rijnsburger | 369/275.1 |
| 4,977,550 | 12/1990 | Furuya et al. | 369/50 |
| 5,093,820 | 3/1992 | Maeda et al. | 369/50 |
| 5,182,741 | 1/1993 | Maeda et al. | 369/50 |

FOREIGN PATENT DOCUMENTS

| | | |
|---|---|---|
| 0049136 | 4/1982 | European Pat. Off. |
| 0165320 | 12/1985 | European Pat. Off. |
| 0166785 | 1/1986 | European Pat. Off. |
| 0175308 | 3/1986 | European Pat. Off. |
| 0228646 | 7/1987 | European Pat. Off. |

OTHER PUBLICATIONS

J. Watkinson, The Art of Digital Audio, Focal Press, pp. 440-487, Jan. 1988.

*Primary Examiner*—Aristotelis Psitos
*Assistant Examiner*—Nabil Hindi
*Attorney, Agent, or Firm*—David G. Conlin; George W. Neuner

[57] ABSTRACT

An information recording and reproducing device has a first recording clock generation circuit which generates a clock based on pre-recorded information on a magneto-optical disk, a second recording clock generation circuit and a switching circuit The switching circuit selects a first recording clock when recording information is of discrete information and selects a second recording clock when recording information is of successive information. Moreover, in the present device, a first reading clock is used as well as a second clock as a clock for reading out the reproduced data from the magneto-optical disk, which had been once stored in memory. The second reading clock having a reference frequency is generated by a second clock generation circuit and is used for reading out successive information such as music information. The first reading clock in synchronization with the reproduced signal is generated by a first reading clock generation circuit and is used for reading out discrete information such as computer-use data. In addition, in the case of discrete information, it is possible to start recording/reproducing operation immediately after an optical head reaches a desired position, thereby permitting to shorten an access time.

14 Claims, 14 Drawing Sheets

(a) | n-1 | n | n+1 | n+2 | n+3 | n+4 | n+5 | n+6 | n+7 |

(b)

(c) c1　　c2　　　　　　c3

(d)

(e) e1　　e2　　　　　　e3

(f)

(g)

(h)

(i) | d1 | d2 | d3 | d4 | d5 |

INFORMATION RECORDING AND REPRODUCING DEVICE PROVIDING FASTER ACCESS TIME TO A RECORDING MEDIUM

This is a continuation of copending application Ser. No. 07/788,999 filed on Nov. 7, 1991, now abandoned.

FIELD OF THE INVENTION

The present invention relates to an information recording and reproducing device which records and reproduces various types of information such as music information, computer-use data, etc., on and from recording media rotating at a constant linear velocity.

BACKGROUND OF THE INVENTION

Conventionally, so-called compact disks (hereinafter referred to as CDs) have been widely used whereon successive information such as music information is recorded as digital signals in the form of optically detectable minute pits. Meanwhile, CD-ROMs (Compact Disc Read Only Memory), whereon discrete information such as computer-use data as well as music information is recorded, have been viewed with interest for its characteristics of large storage capacity and high productivity and already come into use (hereinafter CD-ROMs are included in CDs for convenience). Information on the CDs is reproducible through optical disk reproducing devices for only reproduction (CD players).

FIG. 10 and FIG. 11 are schematic views illustrating a signal format used in the CDs. As shown in FIG. 10, a frame 50a of a recording signal is composed of a frame synchronization signal 50b indicating a head of the frame, a sub-code 50c for additional information data, and a data field 50d having 24-byte main information data and 8-byte error detection and correction parity code added thereto.

In addition, the data field 50d is formed by an error detecting and correcting method including non-complete interleaving called CIRC (Cross Interleaved Reed Solomon Code).

As shown in FIG. 11, ninety-eight of the frame 50a form a sub-coding frame 51a (hereinafter referred to as a sector). Further, ninety-eight of the sub-code 50c in each frame 50a form a sub-coding block 51c. Information such as track numbers (corresponding to music numbers when main information is of music programs), or absolute address information on the disk is indicated by data in the sub-coding block 51c.

Since the length of each sector corresponds to 13.3 ms, seventy five sectors are equivalent to a second. In this case, sector numbers on the disk can be described base on the following data, "minute": "second": "a sector number in one second (taking a value from 00 through 74)". The sector number corresponds to successive time-indicating information and position-indicating information and consecutively increases from an innermost outward of the disk.

FIG. 12 is a typical depiction illustrating an area allocation on the CD. A disk 52 is provided with a main information recording area 52b and a TOC (Table of Contents) area 52a. The main information recording area 52b stores main information such as music information and sector numbers according to the sub-code information.

The TOC area 52a stores additional information of the sub-code relating to respective information recorded in the main information recording area 52b, such as a track number and a recording start sector number of each track. The TOC area 52a also stores other kinds of information such as distinctive information for determining whether recorded information on a track is audio information such as music information or computer-use data.

According to the format, when loading a disk into the CD player, sub-code information in the TOC area 52a is read out, then the number of main information (corresponding to the number of music programs for music information), sector numbers of recording start positions of respective information and a sort of information (whether successive information such as audio information or discrete information such as computer-use data) are recognized. Thereafter, an access operation to a desired track is promptly carried out upon receiving instructions to perform reproducing operation by collating information in the TOC area 52a with the sub-code sector numbers in the main information recording area 52b.

When recording on the CDs, a so-called CLV (Constant Linear Velocity) system is employed for a rotation control. With this system, a recording density becomes constant at any position of the disk. This characteristic is preferable for increasing recording capacity. In a CD player, the CLV control is carried out by controlling a disk rotation such that an interval of the reproduced signal, for example, the frame synchronization signal, which is recorded on the CD at CLV, becomes a reference length.

The following discusses the conventional CD player referring to FIG. 13.

The FIG. 13 is a block diagram illustrating a configuration of the CD player. A spindle motor 62 for supporting a CD disk 61 is controlled by a CLV control circuit 63 so that the CD disk 61 rotates at a constant linear velocity. Then, an optical head 64 is moved to a desired position on the CD disk 61 by means of a moving function (not shown). When a laser beam is projected on the CD disk 61 through the optical head 64, the resulting reflected light beams are converted into an electronic signal according to the intensities thereof. Further, the electronic signal is amplified by a reproduction amplifier 65. Then, it is sent as a reproduced signal to a first clock generation circuit 66 and a reproduced data processing circuit 67.

The first clock generation circuit 66 is composed of a so-called PLL (Phase Locked Loop) which generates a clock in synchronization with the reproduced signal from the reproduction amplifier 65. Further, the reproduced data processing circuit 67 distinguishes the reproduced signal by using a clock generated by the first clock generation circuit 66 and separates the frame synchronization signal therefrom. The reproduced data processing circuit 67 also demodulates "EFM" (Eight to Fourteen Modulation) modulated reproduced data. Thereafter, the CIRC is decoded by a memory 72 for the purpose of correcting errors in the reproduced signal.

A clock system for processing the reproduced data is discussed in detail hereinbelow. When writing the "EFM" demodulated reproduced data in the memory 72, a clock in synchronization with the reproduced signal is required For this reason, the clock generated by the first clock generation circuit 66 is sent to a write address generation circuit 68. A memory address in synchronization with the clock is continuously output from the write address generation circuit 68. A memory address is sent to the memory 72 via a switch 71, whereby the "EFM" demodulated data is written in the memory 72 in a determined order.

On the other hand, a second clock generation circuit 69 is provided for a read-out operation from the memory 72. The second clock generation circuit 69 generates a clock having a determined reference frequency. In a read address generation circuit 70, a memory address is generated according to the reference clock generated by the second clock generation circuit 69. The memory address is continuously sent to the memory 72 via the switch 71, whereby the data from the memory 72 is read out in a determined order. In the reading data, the main data shown in FIG. 11 is again converted into analog audio information by a D/A converter 73 and then output to a terminal 74.

In addition, the write address generation circuit 68 and the read address generation circuit 70 do not have the same address generation order. These circuits also de-interleave the data into the original order, which had been re-arranged through the interleaving method when recording on the disk.

Further, since an actual storage capacity of the memory 72 is limited, writing and read-out operations of the data in and from the memory 72 may not be performed accurately. In order to counteract this, the CLV control circuit 63 makes a fine adjustment on the spindle motor 62 such that, for example, a frequency of the frame synchronization signal in the reproduced signal becomes always a reference frequency of the second clock generation circuit 69. As a result, a successive reproducing operation can be surely performed.

Another reference clock is used for generating addresses in the read address generation circuit 70 other than the reference clock in synchronization with the reproduced signal. This contributes to absorb the deviation in the reproduced signal of the disk rotation system, thereby permitting to perform a reproducing operation with hi-fi audio without having a time based deviation. This is the advantageous characteristic of the digital audio apparatuses and normally called TBC (Time Base Correcting).

Next, a controlling process of an access operation using the CD player having the described configuration is discussed in reference to a flow chart in FIG. 14.

When instructions for reproduction are given by, for example, a user, the optical head 64 is moved to an reproduction start absolute address position on the disk as instructed (S 31 and S 32). When the optical head 64 has been moved to the address position, a still jump (a backward jump per rotation of the disk) is made so that the optical head 64 is held in a wait-state by keeping the light beam at a radial position of the disk (S 33). Then, the CLV control starts (S 34).

After waiting until the determined linear velocity is obtained (S 35), the optical head is held in another wait-state at the radial position of the disk until obtaining a target reproduction start absolute address (S 36). This normally refers to as a waiting time for a disk rotation. Upon obtaining the target reproduction start absolute address, the still jumping operation is set off (S 37), thereby starting the reproducing operation.

Next, regarding variations in the number of the disk rotations, the disk linear velocity and the reproduced signal synchronization clock thus controlled, an example is given by showing a case of accessing from an outer portion toward an inner portion of the disk referring to FIG. 15.

The disk linear velocity gradually decreases as the optical head 64 moves towards the inner portion of the disk. This is because the number of the disk rotations during the time intervals m2 and m3 are substantially the same as the number of the disk rotations during the time interval m1 which ends at t1 at which the instructions for reproduction are given. The time intervals m2 and m3 are for moving the optical head. Here, the reproduced signal synchronization clock gradually decreases in response to the reproduced signal of the disk during the time interval m2 which ends at t2. During the time interval m3, it lies outside the range wherein the PLL is locked and held in a preserve state.

After the optical head has been moved to the target position, the CLV control starts at t3. From t3, both the number of disk rotations and the linear velocity gradually increase. Then, after an elapse of time intervals m4 and m5, the number of the disk rotations and the linear velocity within the determined range are obtained at t5. Meanwhile, the reproduced signal synchronization clock starts increasing from t4 as the reproduced signal increases after an elapse of the time interval m4 as a preserve period. Then, after an elapse of a time interval m6 corresponding to the waiting time for the disk rotation, the reproducing operation starts.

Thus, the discussed CLV system is time consuming in comparison with the CAV (Constant Angular Velocity) system because not only for moving the optical head and the disk rotation, waiting time is required also for the linear velocity control and for another disk rotation before starting the reproducing operation. The CAV system has been generally used when reproducing information from the conventional floppy disks or hard disks, etc., at a constant angular velocity (a constant number of rotation).

When using a re-writable disk such as a magneto-optical disk which has been recently developed, whereon various types of information such as music information, computer-use data, etc., are recorded, the information recording and reproducing device is preferably designed to be compatible with the conventional CD player by employing a common reproducing method.

In this case, especially for an initial disk whereon information has not been recorded, an access operation to sector positions prior to recording nor the CLV control which is required during recording cannot be executed. This is because the initial disk does not have absolute address information defined by the sub-code of the signal format used in the CDs nor the frame synchronization signal used in the CLV control and the like.

To counteract the above-mentioned problems, the following method is proposed as an alternative method for recording absolute addresses without using sub-code information. In this method, guiding grooves on the disk are displaced inward or outward in a radial direction after being "biphase-mark" modulated, or the widths of the guiding grooves on the disk are varied depending on the value of each bit: "0" or "1" (for example, see U.S Pat. No. 4,907,216).

In this case, if a frequency band of a "biphase-mark" modulated absolute addresses and a frequency band of "EFM" modulated recording information are set to differ, the respective reproducing operations can be performed separately. This enables access to an area even whereon no information has been recorded by using the absolute addresses associated with the guiding grooves.

Moreover, by using a reproduction carrier component of the absolute address, more concretely, by comparing the reproduction carrier component with a reference clock generated in the device, an accurate CLV control can be achieved. This is also true during the recording operation. Here, when recording information, the recording signal can be generated by coding/modulating recording information using the reference clock.

Since CDs have large storage capacity, a reproduced data processing device using the CDs described is preferably arranged such that reproducing operation can be performed by promptly accessing to a desired piece of information from the recording medium. Further, another reproduced data processing device using a re-writable disk which is compatible with the CDs, is preferably arranged such that the reproducing operation of various types of information (not restricted to music information) can be performed, especially as an information recording medium for home use by utilizing the disk's advantageous characteristic of being accessible at high speed.

However, when information is recorded using the signal format of the CDs described, an access operation is required prior to the recording operation. The access operation is for controlling the disk rotation to be the determined linear velocity after the optical head has been moved to the desired absolute address position.

In the access operation, the time required for obtaining a constant linear velocity after moving the optical head to the determined address position is generally longer than the time required for moving the optical head to the determined address position. Especially when moving from an innermost portion to a circumferential potion of the disk or vice versa, the ratio of the disk rotation speed is 2:1 or greater where the access time is maximized.

FIG. 16 shows a relationship between various operations for starting up a recording operation and the disk rotation speed in accordance with the information recording and reproducing device employing the re-writable disk. FIG. 17 is a flow chart showing a process up to when the reproducing operation starts.

In FIGS. 16 and 17, when instructions for recording are given by the host device or a user (S 0), the optical head is moved to the target recording start absolute address position as instructed (S 1). Then, it is judged whether or not the optical head has reached the target absolute address position (S 2). Here, the disk rotation speed is kept substantially constant during the time interval m2, i.e., from t1 at which the optical head starts to move until t2 at which the optical head reaches the target absolute address position.

When the optical head has reached the target absolute address position, it is held in a still and wait state by making a still jump (a backward jump by one track which the light beam makes per rotation of the disk) (S 3). In the mean time, the CLV control is enabled (S 4).

Then, it is judged whether or not the determined linear velocity has been obtained (S 5). After an elapse of a time interval m3, if the linear velocity has the predetermined value at t3, it is next to be judged whether or not the optical head has reached the target absolute address position within the track from which the reproducing operation is repeatedly performed by making a still jump (S 6).

After an elapse of a time interval m4, if the optical head has indeed reached the target absolute address, the still jumping operation is set off (S 7), then the recording operation starts (S 8).

As is evident from the above explanation, the discussed CLV system is time consuming in comparison with the so-called CAV (Constant Angular Velocity) system because not only for moving the optical head in a radial direction and the disk rotation, waiting time is required also for the linear velocity control and for another disk rotation.

This may not cause a serious problem when recording successive information having a large memory such as music information. However, as for discrete information such as computer-use data, every time performing a recording operation, additional waiting time is required for a linear velocity control. Thus, this system is not suitable especially when information has small memory and when recording and re-writing operations are performed frequently.

Moreover, even if the driving capability for moving the optical head in a radial direction is improved for the purpose of improving the access velocity, the waiting time required for the linear velocity control and for the disk rotation until reaching the target absolute address position cannot be shortened. Thus, the problem this causes of the long access time still remains unsolved.

On the other hand, when reproducing information using the discussed conventional method, an additional waiting time is required for obtaining a determined linear velocity by controlling the number of disk rotations as well as the waiting time required for a so-called access operation, i.e., for moving the optical head to a desired position on the disk. This causes the problem that the reproducing operation cannot be performed promptly.

The waiting time for controlling the number of the disk rotations is usually longer than the time required for moving the optical head. Especially when moving from an innermost portion to a circumferential portion (or from the circumferential portion to the innermost portion) of the disk, the ratio of the disk rotation speed is 2:1 or greater where the access time is maximized. This problem is not serious when dealing with audio information like music information. However, as for discrete information such as computer-use data, every time performing a reproducing operation, additional waiting time is required for a linear velocity control. This causes the problem that the computer's capability in terms of processing is lowered.

Moreover, even if the driving capability for moving the optical head in a radial direction is improved for the purpose of improving the access velocity, the waiting time for the rotation control and for the disk rotation will override the improved driving capability, thereby failing to obtain an overall improvement in the access velocity.

FIG. 18 is a diagram for discussing another problem which arises when adopting the discussed CD format to the re-writable disk. The figure illustrates a reproducing operation when recorded information is stored in five sectors from (n) to (n+4) with respect to a sector line (see FIG. 18 (a)) on the disk having a unique absolute address value indicated by pre-recorded information such as rotation control information, etc.

Here, a reproduced signal is shown in FIG. 18 (b). Sectors other than the five sectors, i.e., a sector (n−1) and sectors (n+5) through (n+7) represent areas whereon no information has been recorded. The reproduced signal is converted into a digital reproduced signal (see FIG. 18 (c)) by means of, for example, a comparator. However, in the area whereon no information has been recorded, i.e., the sector (n−1) and the sectors (n+5) through (n+7), the reproduced signal (see FIG. 18 (b)) is in the noise level, and corresponding digital reproduced signals (c1) and (c3) become meaningless data having high frequency components.

Thus, as shown in FIG. 18 (d), in the area whereon no information has been recorded, the PLL, for generating a clock in synchronization with the reproduced signal, generates a clock having a high frequency as a result of following the digital reproduced signal (a vertical axis indicates the frequency).

Here, an explanation is given in accordance with the discussed TBC operation. A clock for memory writing (see FIG. 18 (e)) is in synchronization with the reproduced signal. Thus, in areas (e1) and (e3), information is written in a memory using a clock having a high frequency. On the other hand, a clock for memory reading out (see FIG. 18 (f)) is a reference clock having a determined frequency. Thus, there is a difference of the frequences between the clock for memory writing and the clock for memory reading out as is shown in FIG. 18 (g).

For this reason, so called memory over-flowing phenomenon occurs wherein new data is written before reading out pre-recorded data. This depends on the storage capacity of the memory. The detection of the memory over-flow is shown in FIG. 18 (h) (a memory over-flowing state is represented by a high level).

On the other hand, the sectors (n) through (n+4), i.e., the sectors for reproduction, the data stored in these sectors on the disk is reproduced and then written in the memory. Here, a determined time delay arises from de-interleaving and error correcting operations done using the CIRC. Thus, as shown in FIG. 18 (i), the memory read-out operation of the data corresponding to the sectors (n) through (n+4) is lagged and performed respectively in accordance with (d1) through (d5).

Therefore, during the read-out operation of the data (d5), memory over-flow arises at a transfer point from a low level to a high level as shown in FIG. 18 (h). Thus, a part of the data (d5) stored in the memory is destroyed, thereby presenting the problem of triggering errors.

SUMMARY OF THE INVENTION

An object of the present invention is to provide an information recording and reproducing device which can ensure recording and reproducing operations promptly on and from a recording medium and can ensure a highly reliable reproducing process without having any adverse effect, for example, from an unnecessary signal which is stored on an area whereon no information has been recorded.

Another object of the present invention is to provide an information recording and reproducing device capable of promptly performing highly reliable recording and reproducing operations, for example, even when dealing with discrete information such as computer-use data intermixed with successive information such as music information.

In order to achieve the above objects, the present invention wherein reproduced data is recorded in memory means by using a writing clock in synchronization with the reproduced data for reading out the reproduced data from the memory means, is characterized in that first clock generation means is provided for generating a first reading clock in synchronization with the reproduced data as a reading clock for reading out the reproduced data from the memory means.

According to this arrangement, the reproduced data is written in the memory means by using the writing clock in synchronization with the reproduced data from the recording medium; whereas, the reproduced data is read out by using the first reading clock in synchronization with the reproduced data. With the conventional device, however, even after the optical head has been moved, the reproducing operation did not start until obtaining the determined linear velocity of the disk corresponding to a clock having a reference frequency. Thus, the above-mentioned arrangement is superior to the conventional arrangement in that immediately after the optical head has been moved, it is possible to start the reproducing operation, thereby permitting to shorten the access time. Moreover, the writing and the read-out operations are performed using clocks in synchronization with the reproduced data. Thus, the occurrence of over-flow in the memory means is restrained, thereby improving the reliability of the reproducing operation.

The information recording and reproducing device having the described configuration, may further include: second clock generation means for generating a second reading clock having a determined reference frequency; switching means for alternatively selecting either the first reading clock or the second reading clock as a reading clock; and control means for controlling a selection by the switching means based on distinctive information which determines whether information recorded on a determined area of the recording medium is successive or discrete.

According to this arrangement, when reproducing successive information such as music information, the switching means automatically selects the second reading clock having the determined reference frequency as a reading clock. This permits to ensure the reproducing operation without having a time based deviation by means of the TBC operation. Therefore, an access operation is promptly carried out when dealing with discrete information such as computer-use data. In the mean time, a highly reliable reproducing operation can be achieved for both types of information, i.e., successive information and discrete information.

In order to achieve the above-mentioned objects, another information recording and reproducing device of the present invention, using a recording medium whereon recording information is formed which includes rotation control information for controlling a disk rotation at a constant linear velocity, is characterized in including: first recording clock generation means for generating a recording clock for signal processing when recording based on pre-recorded information on the recording medium.

According to this arrangement, when recording discrete information such as computer-use data, the recording clock for processing recorded signal is generated by the first recording clock generation means based on pre-recorded information on the disk. This permits to start the recording operation before obtaining the determined linear velocity as long as a recording head has reached a target absolute address through an access operation.

More concretely, if a value of the linear velocity when the head reaches the target absolute address is smaller than the value of the determined linear velocity, the frequency of the recording clock from the first recording clock generation means also becomes smaller than the standard frequency. Similarly, if a value of the linear velocity is greater than the value of the determined linear velocity, the frequency of the recording clock from the first recording clock generation means also becomes greater than the standard frequency. However, since the frequency of the recording clock generated by the first recording clock generation means is proportional to the linear velocity, each piece of information can be recorded at a constant recording density on substantially the target address position, i.e., substantially the same address position as when recording at the determined linear velocity. As a result, the access time can be shortened by starting the recording operation before obtaining the determined linear velocity.

The present invention having the described configuration may further include: second recording clock generation means for generating a recording clock having a determined reference frequency; and selection means for selecting a recording clock from the first recording clock generation means when dealing with discrete information, while selecting a recording clock from the second recording clock generation means when dealing with successive information.

According to this arrangement, when recording discrete information, a recording clock is generated based on disk rotation information stored on the disk in the similar manner to the above-mentioned case. On the other hand, when recording successive information, the second recording clock generation means is selected by the recording clock selection means so as to generate a recording clock having a reference frequency.

Therefore, in the case of successive information, the recording operation can be performed in the similar manner to the conventional example using a recording signal in synchronization with an external input signal having no time based deviation. In addition, although a slightly occurred time based deviation may not cause a serious problem when recording discrete information such as computer-use data, the occurrence of the time based deviation should be avoided especially when recording music information or the like. For this reason, the reference clock is used as described above.

For a fuller understanding of the nature and advantages of the invention, reference should be made to the ensuing detailed description taken in conjunction with the accompanying drawings.

DESCRIPTION OF THE EMBODIMENTS

Referring to FIG. 1 to FIG. 5, one embodiment of the present invention is described below.

Figure 4:
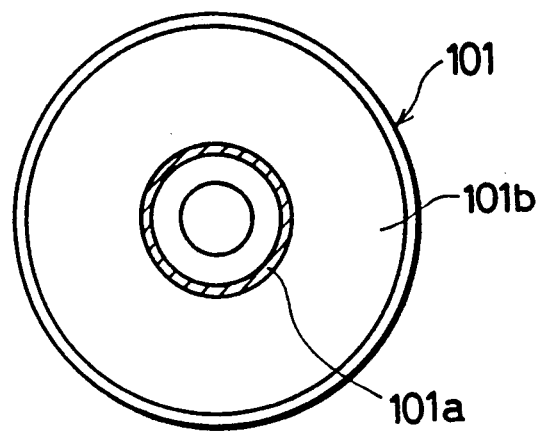
FIG. 4 is a schematic plan view illustrating a magneto-optical disk whereon recording is performed by the device of FIG. 1.
Figure 10:
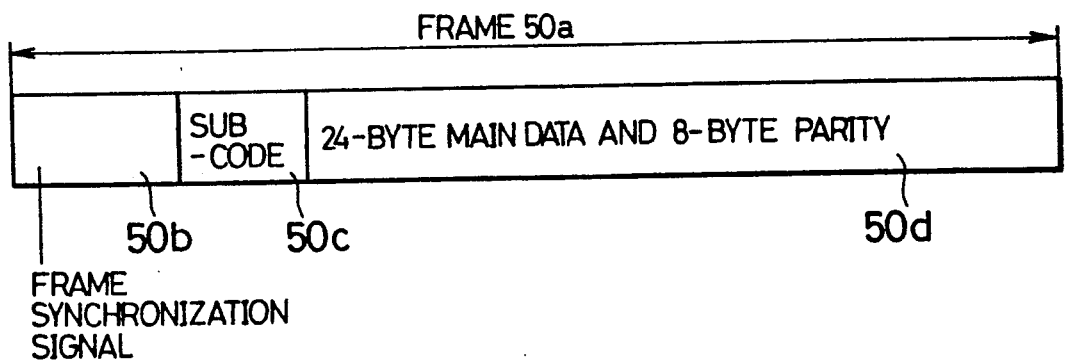
FIG. 10 is a typical depiction illustrating a frame signal format to be recorded on the conventional compact disk.
Figure 11:
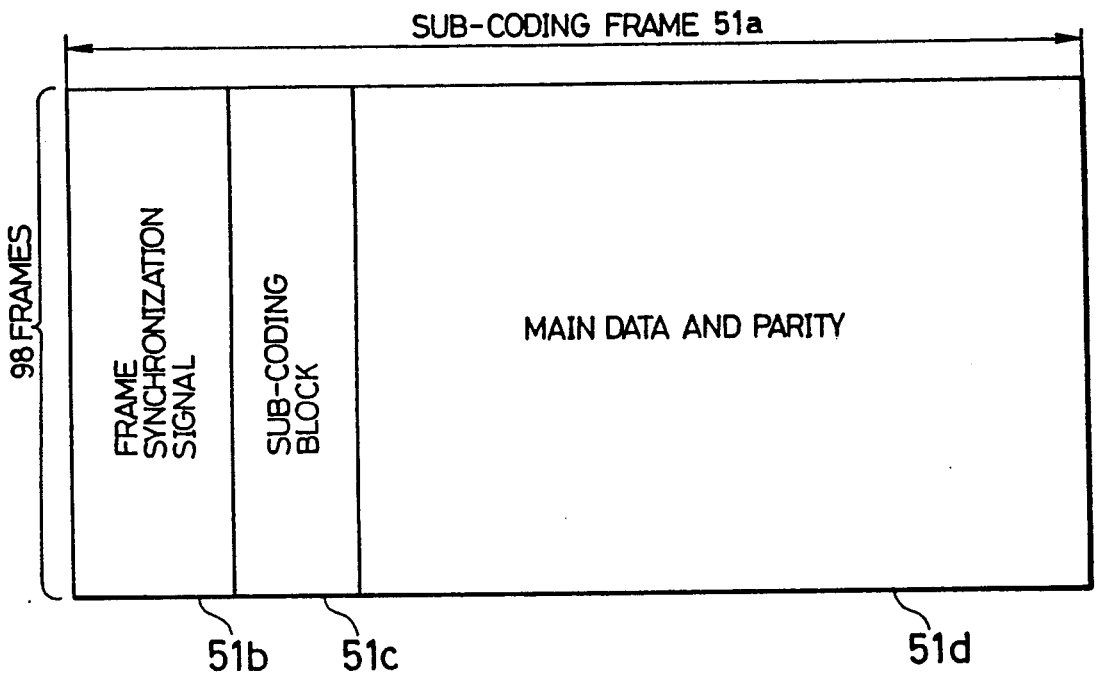
FIG. 11 is a typical depiction illustrating a sector format of the compact disk.
Figure 12:
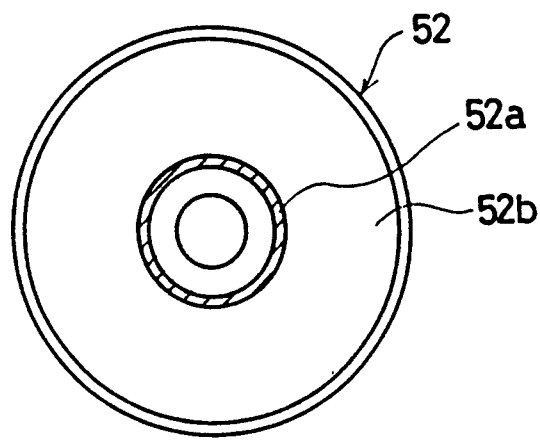
FIG. 12 is a schematic plane view illustrating information recording area on the compact disk.
Figure 13:
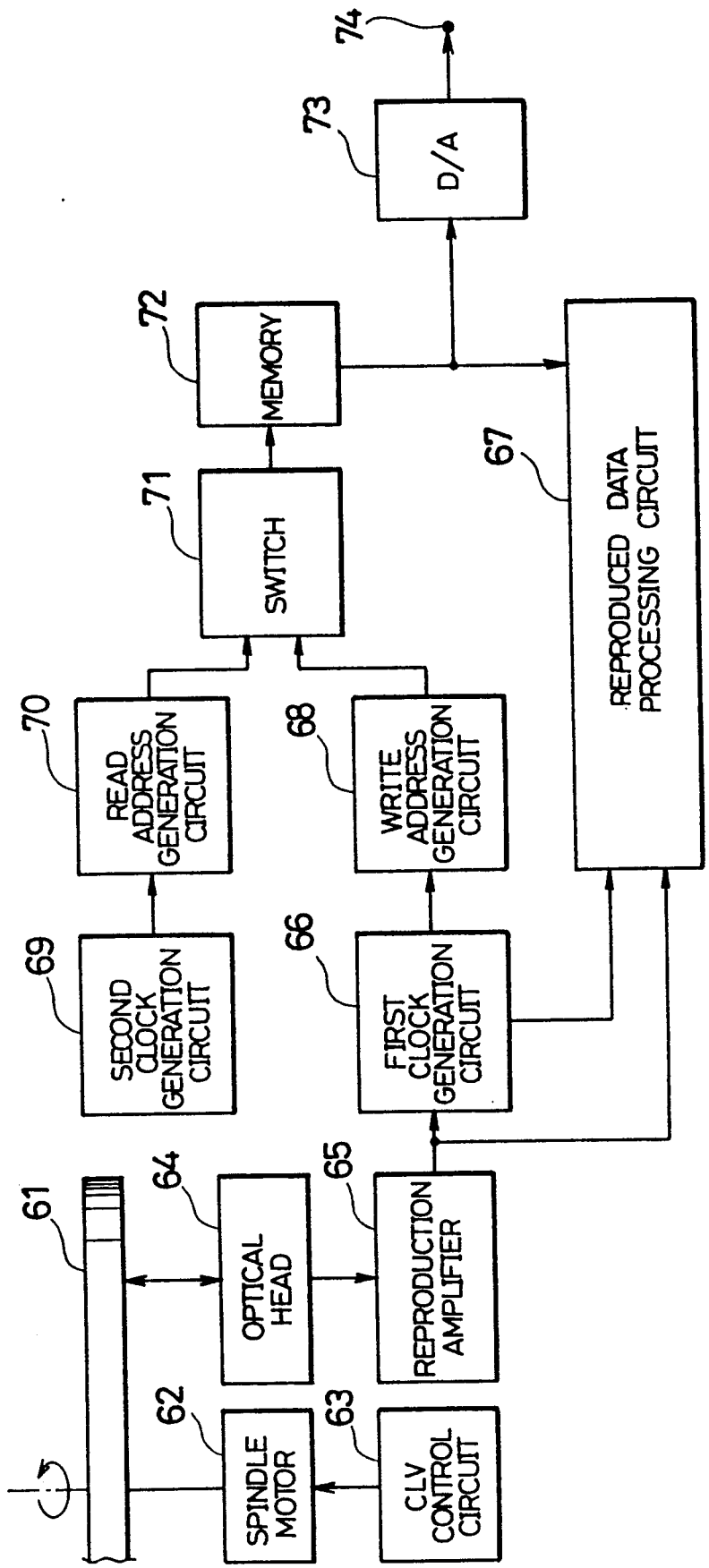
FIG. 13 is a block diagram illustrating a configuration of the conventional CD player which performs reproducing operation from the compact disk.
Figure 14:
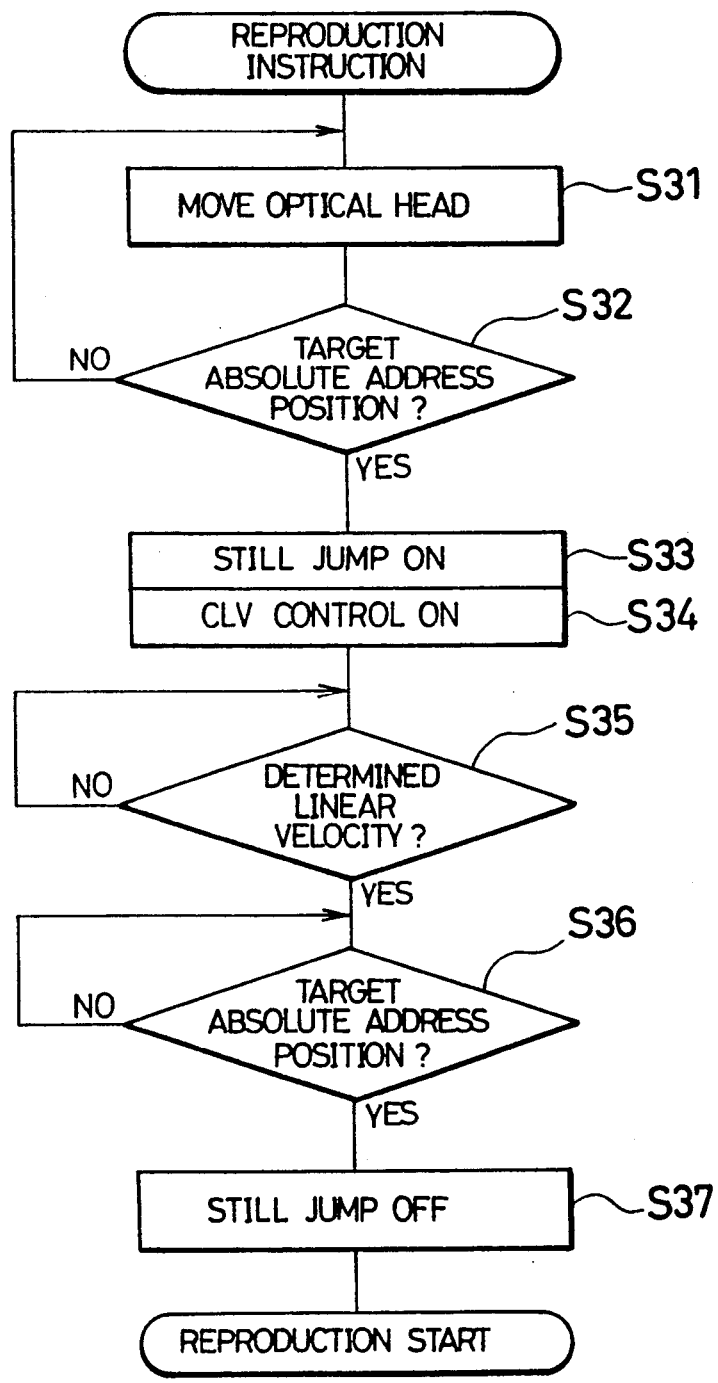
FIG. 14 is a flow chart illustrating controlling process when reproducing information with the CD player.

As shown in FIG. 4, a magneto-optical disk 101 as a re-writable recording medium is provided with a TOC (Table of Contents) area 101a in its innermost end part. Most of area other than the TOC area 101a is occupied by a information recording area 101b. The information recording area 101b is provided for recording thereon various types of information such as characters, pictures, code data, etc., as well as music information. On the other hand, the TOC area 101a is provided for recording additional information relating to each piece of information recorded on the information recording area 101b, for example, information regarding a starting sector position and an ending sector position for each piece of information, or other kinds of information such as information which is used to determine whether the data is successive like music program or discrete like computer-use data, etc. A signal format being employed here is the same as those of the conventional example shown in FIGS. 10 and 11, thus the description thereof is omitted.

Figure 5:
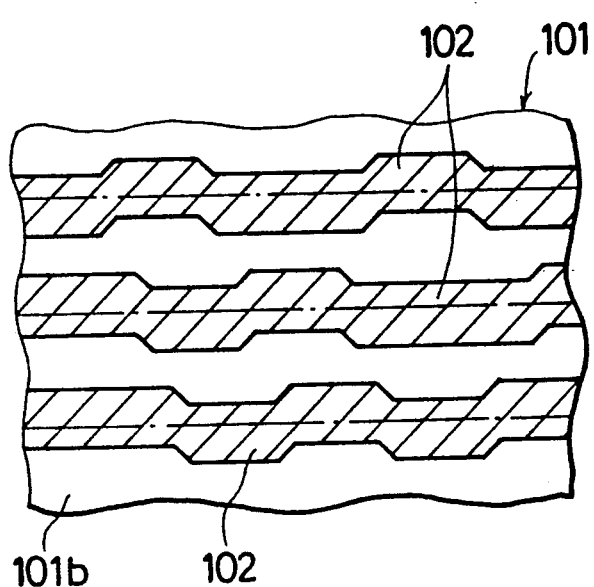
FIG. 5 is an enlarged plane view illustrating the magneto-optical disk of FIG. 4.

As shown in FIG. 5, spiral guiding grooves 102 (shown by hatching) are formed in advance in the TOC area 101a and the information recording area 101b at a determined interval in a radial direction.

After being "biphase-mark" modulated, the absolute addresses on the disk are recorded as pre-recorded information by displacing the guiding grooves inward or outward in a radial direction according to the value of each bit: "1" or "0". The absolute addresses indicating positions on the disk are pre-recorded information as information for a rotation control at CLV (constant Linear Velocity). In addition, the absolute address here corresponds to a sector in the CD format, and thus called simply a sector hereinbelow.

Figure 1:
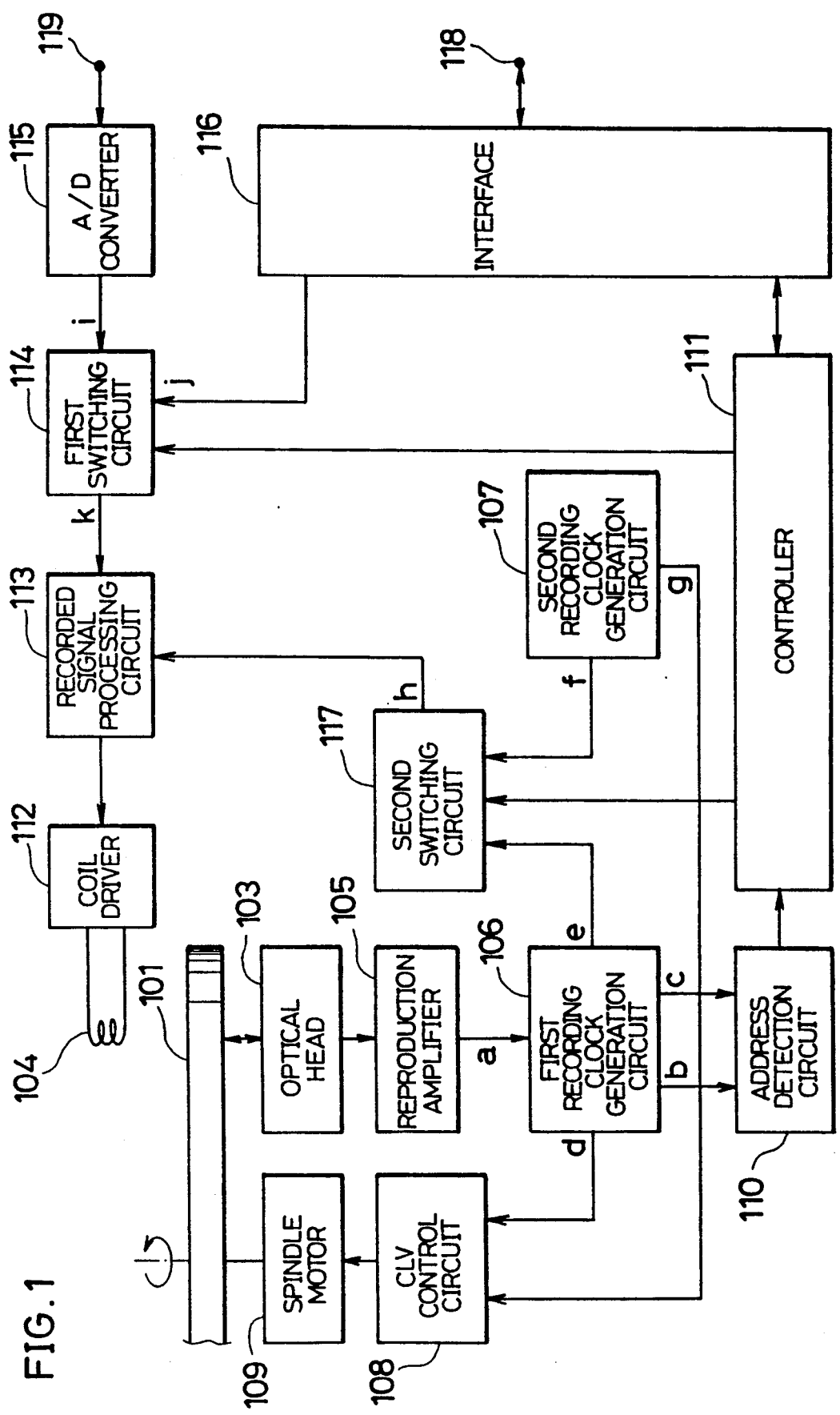
FIG. 1 is a block diagram showing a schematic configuration of an information recording reproducing device of the present invention.

As shown in FIG. 1, the information recording and reproducing device comprises: a spindle motor 109 which supports and rotates the magneto-optical disk 101; an optical head 103 (optical head means) for projecting a laser beam on the magneto-optical disk 101 when recording or reproducing; and a coil 104 for applying magnetic field on the magneto-optical disk 101 when recording.

The information recording and reproducing device is arranged such that the so-called magnetic field modulation method is employed as a recording method. Here, the recording method called over-writing is adopted wherein information is re-written directly on pre-recorded information. The information recording and reproducing device is provided with a terminal 118 and an input terminal 119. The terminal 118 is provided for receiving instructions given by the host device, such as instructions for recording, or instructions for inputting data such as characters, pictures or other types of information. The input terminal 119 is provided for inputting analog information, such as music information, to be recorded from outside the device.

For example, when recording music information, the input analog information from the input terminal 119 is converted into a digital signal as data i by an A/D (analog/digital) converter 115. Thereafter, the digital signal is sent to a recorded signal processing circuit 113 as data k through a first switching circuit 114.

In the recorded signal processing circuit 113, an error detection and correction parity is generated, and then the error detection and correction parity and sub-code information are added to digital data k from the first switching circuit 114. After being "EFM" modulated, a frame synchronization signal is added, then the digital data k is sent to a coil driver 112. Here, a recording clock h (clock for generating a recording signal) to be used in a generation process of the recording signal is supplied by a second switching circuit 117 (to be described later).

The coil driver 112 drives the coil 104 based on an input signal; in the mean time, a laser beam for recording is projected from the optical head 103 onto the magneto-optical disk 101, thereby performing the recording operation of the signal. The signal format being employed here is the same as those of FIGS. 10 and 11, and the description thereof is omitted.

On the other hand, when recording discrete information such as character information, etc., input information from the terminal 118 is sent to the first switching circuit 114 as data j via an interface 116. Similarly, it is sent as the data k from the first switching circuit 114 to the recorded signal processing circuit 113. Then, the recording operation is performed in the similar manner to the discussed case.

The signal reproduced (including during recording) by the optical head 103 is amplified by a reproduction amplifier 105, and then sent to a first recording clock generation circuit 106 (the first recording clock generation means) as a reproduced signal The reproduced signal a includes an error signal for a light beam servos (focus and tracking servos). In the error signal, pre-recorded information, i.e., "biphase-mark" modulated absolute address information (used also as rotation control information), is obtained by a tracking signal of the tracking servo.

The first clock generation circuit 106 generates a clock which is set in synchronization with pre-recorded information in the reproduced signal by a PLL (Phase Locked Loop). Then, a clock d is sent to a CLV control circuit 108. The clock d is in synchronization with pre-recorded information composed of a "biphase-mark" modulated absolute address signal. Further, a clock c is sent to an address detection circuit 110. The clock c is the same as digital pre-recorded information b and the clock d. Further, a recording clock e is generated as a clock in synchronization with the reproduced signal a, i.e., pre-recorded information. Then, the recording clock e is sent to the second switching circuit 117 (recording clock selection means).

In the CLV control circuit 108, the clock d, from the first clock generation circuit 106, and a reference clock g, from a second recording clock generation circuit 107 the second recording clock generation means), are compared in their phases. Then, the spindle motor 109 is controlled by its difference signal which varies with the phase difference, thereby enabling an accurate CLV control.

The address detection circuit 110 includes a biphase-mark demodulator and an address decoder. The address detection circuit 110 demodulates in the form of "biphase-mark" the pre-recorded information b extracted by the first recording clock generation circuit 106 using the clock c. Thereafter, the demodulated pre-recorded information b is decoded into position-indicating information on the disk, i.e., the absolute address value indicating the sector numbers, by means of an address decoder, then sent to a controller 111.

On the other hand, the second recording clock generation circuit 107 is arranged so as to generate a recording clock f having the reference frequency and sent it to the second switching circuit 117. Similarly, the reference clock g is generated and then sent to the CLV control circuit 108. The reference clock g, in synchronization with the recording clock f, is required for a rotation control.

The controller 111 (control means) is designed so as to receive instructions for recording given by the host device through the terminal 118 and the interface 116. In addition, the controller 111 has an access function by which recognizes a position of the optical head 103 on the disk through information from the address detection circuit 110. Further, by utilizing the moving function (not shown) of the optical head 103 and the coil 104, the controller 111 moves the optical head 103 and the coil 104 to the desired position.

Figure 2:
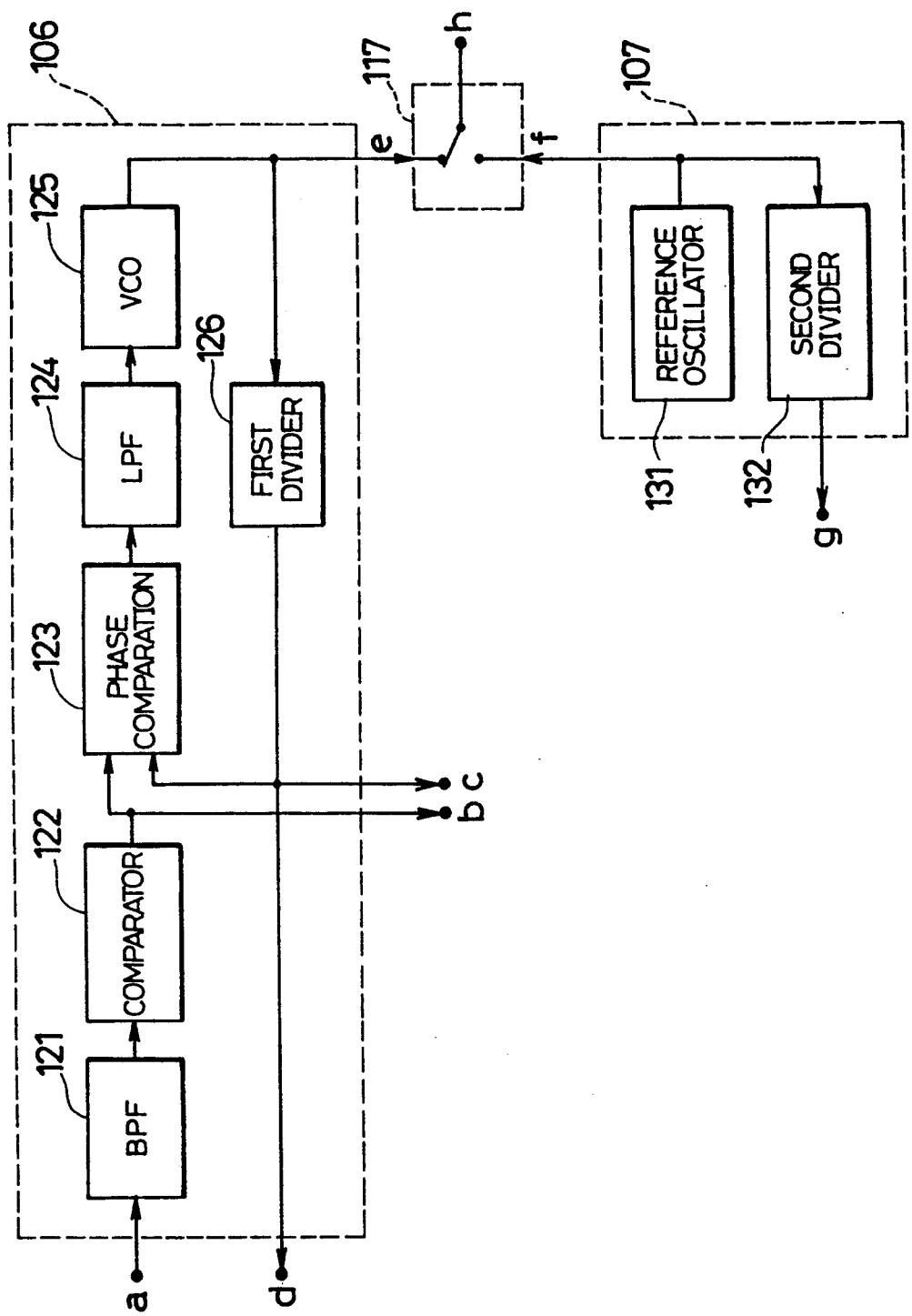
FIG. 2 is a detailed block diagram illustrating an essential part of FIG. 1.

FIG. 2 is a block diagram explaining the clock generation/selection section of FIG. 1 in greater detail.

In the first recording clock generation circuit 106, only a pre-recorded information component is extracted from the reproduced signal a from the reproduced amplifier 105 by means of a BPF (Band Pass Filer) 121. Then, the extracted pre-recorded information component is digitalized by means of a comparator 122. Thereafter, the digital pre-recorded information b is sent to the address detection circuit 110, in the mean time, input into the PLL. The PLL is composed of a phase comparator 123, a LPF (Low Pass Filter) 124, a VCO (Voltage Controlled Oscillator) 125 and a first divider 126.

The recording clock e generated by the VCO 125 is sent to the second switching circuit 117. Further, the recording clock e is divided by the first divider 126. The resulting clock c, having a frequency to be compared with the frequency of the digital recorded information b from the comparator 122, is sent to the address detection circuit 110. In the mean time, the resulting clock d is sent to the CLV control circuit 108.

In the phase comparator 123, the difference signal is generated as a result of making a phase comparison between the digital pre-recorded information b and the clock c. The difference signal is supplied as a control voltage for the VCO 125 after being leveled by means of the LPF 124. Therefore, both the clock e for generating a recording signal and the clocks c and d become a signal which is in synchronization with the digital pre-recorded information b within the range wherein the PLL is locked. The second recording clock generation circuit 107 is composed of a reference oscillator 131 and a second divider 132. The reference oscillator 131 generates the recording clock f having the same reference frequency as the recording clock e under the determined linear velocity condition. The clock f for generating a recording signal is divided by the second divider 132, and the resulting reference clock g is for the rotation control. Then, the reference clock g is sent to the CLV control circuit 108. More concretely, as the frequency of the recording clock e (at the determined linear velocity) and the recording clock f, for example, 4.3218 [MHz] (or its integral multiple), i.e., the channel bit frequency at the time of the "EFM" modulation process for CDs is selected. As the frequency of the clocks c and d (at the determined linear velocity) and the clock g, for example, 22.05 [kHz] is selected. Here, the division ratio between the first divider 126 and the second divider 132 is 1/196 (or integral multiple of the denominator).

Figure 3:
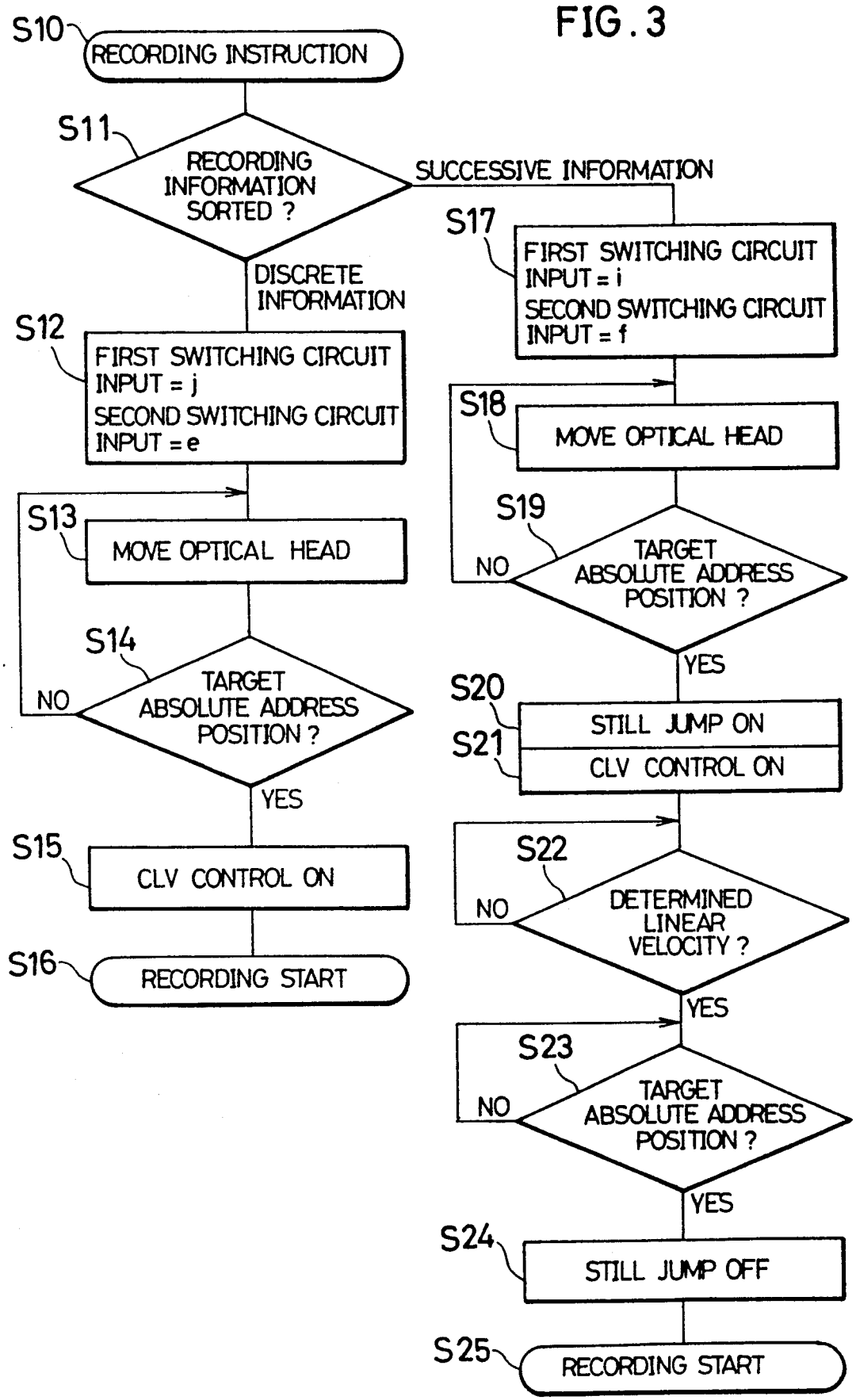
FIG. 3 is a flow chart showing a process of an access operation when recording with the device of FIG. 1.

Next, recording operations of the different types of information are discussed according to the flow chart in FIG. 3.

The terminal 118 receives instructions for recording given by the host device or the user (S 10), then the instructions are sent to the controller 111 via the interface 116. In response to the instructions, it is first to be determined whether information to be recorded is successive like music information or discrete like computer-use information (S 11).

When recording discrete information, it is switched such that information j from the interface 116 is output as an output k from the switching circuit 114. Similarly, it is switched such that the recording clock e from the first recording clock generation circuit 106 is output as an output h from the second switching circuit 117 (S 12).

Next, the optical head 103 and the coil 104 are moved to the instructed recording start absolute address position on the disk (S 13). Then, it is judged whether or not the optical head has reached the target absolute address position (S 14).

Then, upon reaching the target absolute address position, the CLV control starts (set on) (S 15), and the recording operation of information starts immediately (S 16).

In addition, in the above explanation, the CLV control started upon reaching the recording start absolute address position. However, the CLV control may start before reaching the recording start absolute address position.

On the other hand, in S 11, when recording successive information such as audio information, etc., it is switched such that information i from an A/D converter 115 is output as the output k from the first switching control 114. Similarly, the recording clock f from the second recording clock generation circuit 117 is output as the output h from the second switching circuit 117 (S 17).

Figure 17:
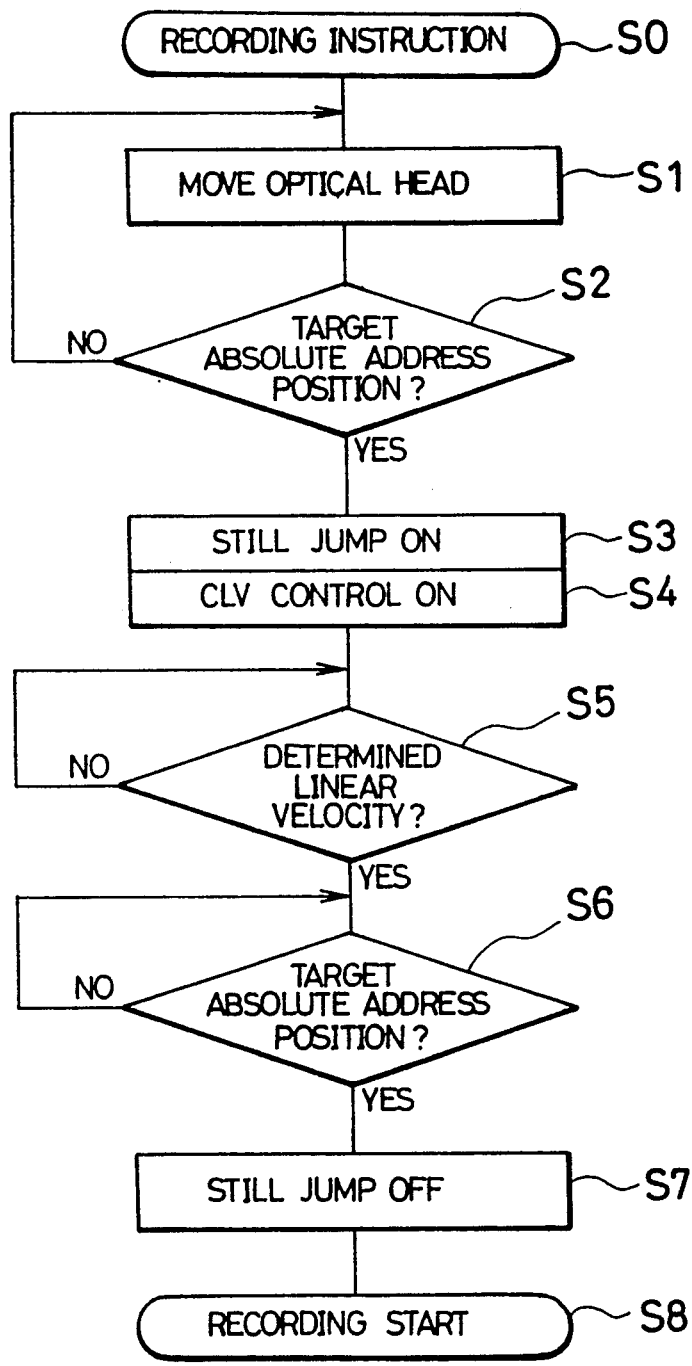
FIG. 17 is a conventional flow chart illustrating an access operation process when recording.

Thereafter, the optical head 103 is moved to the recording start absolute address position following the same process as S 1 through S 8 of FIG. 17. Here, portions of explanation which are repetitive will be omitted. Then, the recording operation starts after obtaining the determined linear velocity through the CLV control (S 18 through S 25).

Figure 16:
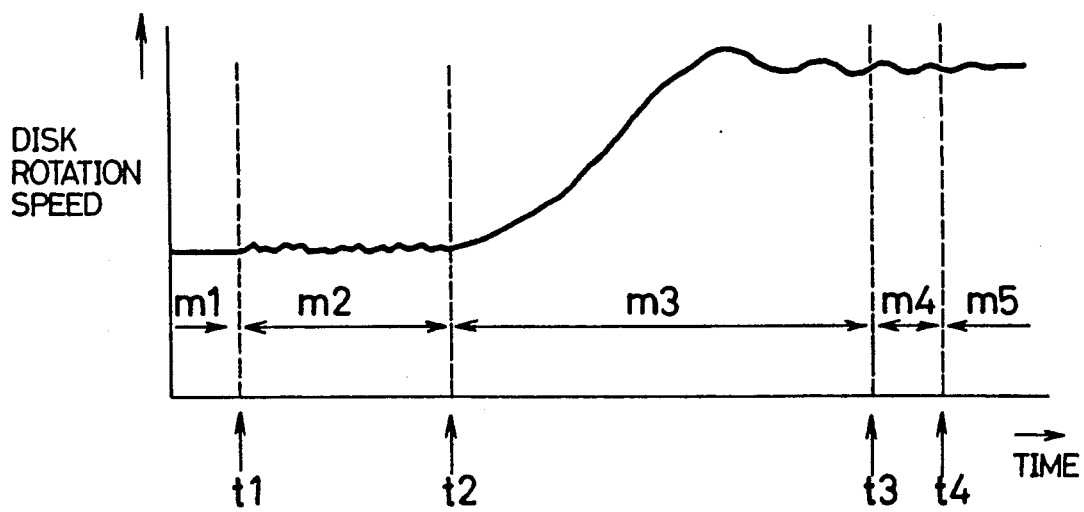
FIG. 16 is a time chart when accessing for explaining both the present invention and the conventional example.

Next, the operations in S 12 through S 16 are discussed referring to FIG. 16.

When recording discrete information such as computer-use data, etc., the time interval m2 required for the optical head 103 to obtain the determined linear velocity is the same as that of the conventional model. The time interval m2 starts at t1 where the instructions for recording are received. However, in the present embodiment, the recording of information starts immediately after reaching the recording start absolute address position at t2 (the recording operation started at t4 in the conventional example). In this respect, the present invention is superior to the conventional device.

The determined linear velocity has not been obtained like the conventional model at t2. However, in the recorded signal processing circuit 113, the recording clock e is supplied via the second switching circuit 117. The recording clock e is generated by the first recording clock generation circuit 106 and in synchronization with pre-recorded information on the disk. For this reason, even before the determined linear velocity is obtained, information can be recorded in the target absolute address position on the disk. In other words, information can be recorded piece by piece in substantially the same absolute address positions as when recoding at the determined linear velocity.

As aforementioned, the recording operation of discrete information such as computer-use data, can be promptly performed using a large storage capacity disk at a constant linear velocity. Moreover, the recording operation of successive information such as music information can be performed using a recording clock having the reference frequency which is generated in the device.

In addition, the above-mentioned embodiment has been discussed on the case of recording both music information as an example of successive information and computer-use data as an example of discrete information. However, the present invention is also applicable to the case of recording only discrete information such as the computer-use data or compressed data of music information. In this case, a recording clock is generated based on pre-recorded information stored on the disk. Thus, the second recording clock generation circuit 107 and the second switching circuit 117 in FIG. 1 are not required.

Further, the above-mentioned embodiment discussed on the case of recording music information as an example of successive information using a clock having a reference frequency. However, music information may be recorded using the recording clock e as well if an information supply source has a function by which information can be recorded following the recording clock e in synchronization with pre-recorded information.

In addition, the type of the absolute address is not restricted to the one formed by displacing the guiding grooves 2 shown in FIG. 5, other types of absolute address can be used as well, as long as recognizable when it was previously recorded.

Further, the disc-shaped recording medium of the magneto-optical system is employed in the above embodiment. However, other re-writable type recording media or once re-writable type recording media may be employed as well. In addition, the recording medium is not restricted to the disc-shaped recording media, card-shaped ones may be used as well.

As aforementioned, an information recording and reproducing device of the present invention is provided with first recording clock generation means for generating a recording clock for signal processing when recording based on pre-recorded information on the recording medium.

According to this arrangement, as long as the recording head has reached the target absolute address, it is possible to start the recording operation even before a determined linear velocity is obtained, thereby permitting to shorten the access time.

Another information recording and reproducing device of the present invention having the above-mentioned configuration further includes: second recording clock generation means for generating a recording clock having a determined reference frequency; recording clock selection means for selecting a recording clock from the first recording clock generation means when dealing with discrete information, while, selecting a recording clock from the second recording clock generation means when dealing with successive information.

According to this arrangement, when recording discrete information, the recording clock is generated based on rotation control information in the similar manner to the discussed case. On the other hand, when recording successive information, the second recording clock generation means is selected by the recording clock selection means so as to generate the recording clock having a reference frequency. Therefore, when dealing with successive information, the recording operation can be performed by using the recording signal which is in synchronization with an external input signal and has no time based deviation in the similar manner to the conventional example. On the other hand, when dealing with discrete information, it is possible to start the recording operation immediately after reaching the target absolute address position before the determined linear velocity is obtained.

Another embodiment of the present invention is discussed hereinbelow referring to FIGS. 6 through 9. Here, a magneto-optical disk 1 to be disclosed as a re-writable type recording medium has a similar function to the magneto-optical disk 101 in the above embodiment, thus the detailed description thereof is omitted.

Figure 6:
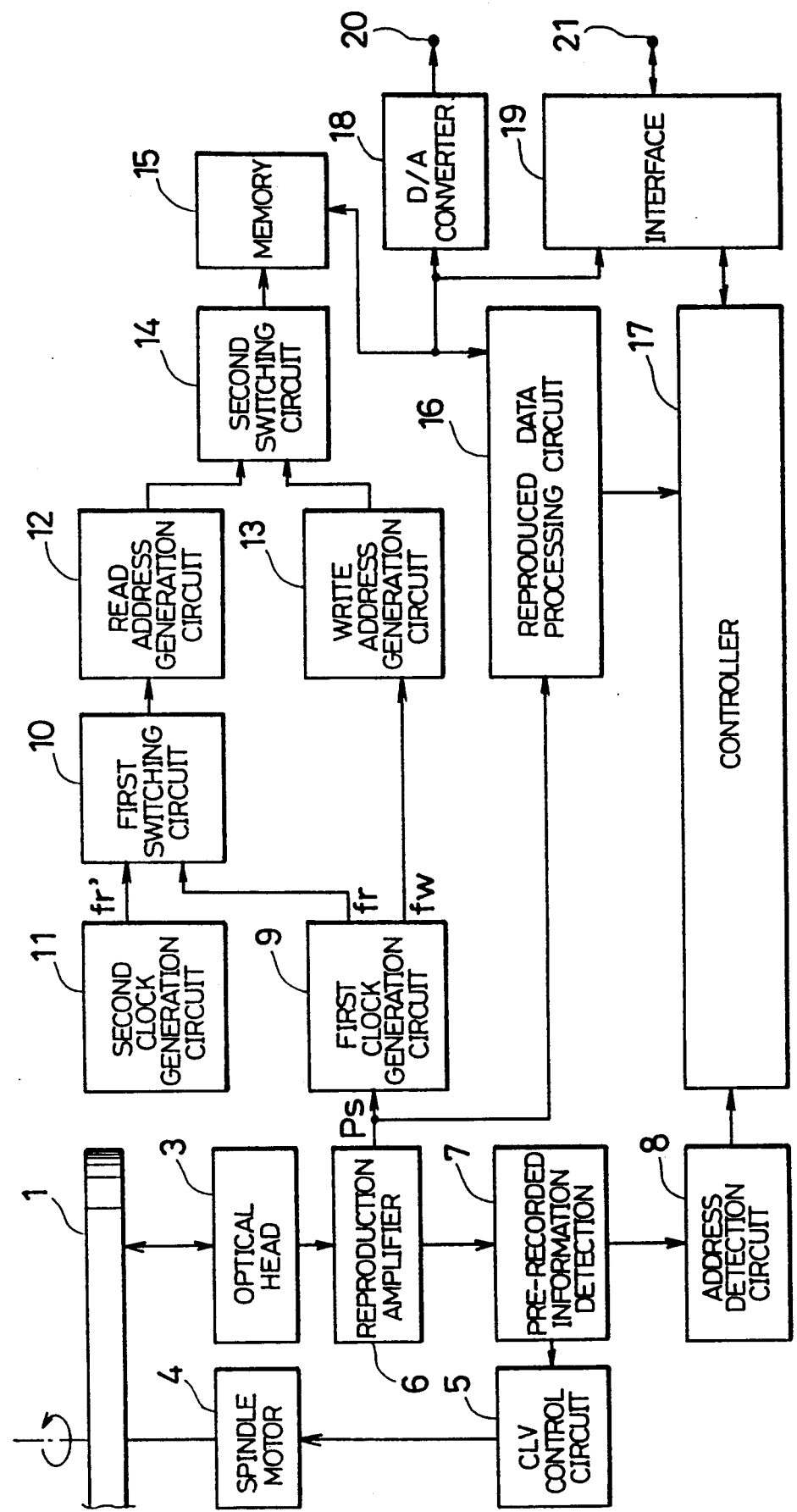
FIG. 6 is a block diagram illustrating a schematic configuration of another information recording and reproducing device of the present invention.

The information recording and reproducing device for reproducing information recorded on the magneto-optical disk 1 is provided with a spindle motor 4 and an optical head 3 (optical head means) as shown in FIG. 6. The spindle motor 4 supports and rotates the magneto-optical disk 1. The optical head 3 projects a laser beam onto the magneto-optical disk 1 and also outputs a reproduced signal in response to the reflected lights.

The reproduced signal from the optical head 3 enters a reproduction amplifier 6 where the reproduced signal is amplified and digitalized, then the digital reproduced signal is released as a magneto-optical signal Ps. The magneto-optical signal Ps enters a first clock generation circuit 9, a reproduced data processing circuit 16 and a pre-recorded information detection circuit 7. The first clock generation circuit 9 also functions as the first reading clock generation means.

The pre-recorded information detection circuit 7 is composed of, for example, a band pass filter and a PLL. The PLL generates a clock which is in synchronization with pre-recorded information in the reproduced signal extracted by the band pass filter. Then, a clock, in synchronization with pre-recorded information, enters a CLV controlling circuit 5. Here, pre-recorded information is of "biphase-mark" modulated absolute address information.

The clock, in synchronization with pre-recorded information, is generated by the pre-recorded information detection circuit 7. In the CLV controlling circuit 5, it is compared with a reference frequency generated inside the device (in synchronization with a clock from a second clock generation circuit 11 to be described later). Then, the spindle motor 4 is controlled by using the resulting difference signal which varies depending on the phase difference, thereby performing an accurate CLV control.

Further, pre-recorded information in the reproduced signal extracted by the pre-recorded information detection circuit 7 enters an address detection circuit 8. The address detection circuit 8 is composed of a biphase-mark demodulation circuit and an address decoder. After demodulating pre-recorded information in the form of "biphase-mark", position-indicating information on the disk, i.e., a signal decoded into an absolute address value of a sector, is generated by the address decoder. Thereafter, position-indicating information enters a controller 17 having a function as reading clock switch controlling means.

On the other hand, the digital magneto-optical signal Ps from the reproduction amplifier 6 enters the first clock generation circuit 9. The first clock generation circuit 9 generates a write address generation use clock fw, in synchronization with the digital magneto-optical signal Ps, and a read address generation use clock (the first reading clock) fr by means of the PLL. Then, the first generation circuit 9 sends the write address generation use clock fw to a write address generation circuit 13, and sends the read address generation clock fr to one of the inputs of a first switching circuit 10 as a switching means (to be described later). On the other hand, a read address generation use reference clock fr' (the second reading clock) is sent to the second clock generation circuit 11 as second reading clock generation means.

The first switching circuit 10 has a function by which either the read address generation use clock fr or the read address generation use clock fr' is alternatively selected, and then sends the selected clock to a read address generation circuit 12.

The digital magneto-optical signal Ps enters the reproduced data processing circuit 16 which separates a frame synchronization signal from the digital magneto-optical signal Ps. The reproduced data processing circuit 16 also demodulates the frame synchronization signal in the form of "EFM". By the reproduced data processing circuit 16, sub-code information is separated and sent to the controller 17 (control means). The reproduced data processing circuit 16 also writes main data and a parity as reproduced data in a memory (memory means) 15, and then makes an error correction by means of CIRC (Cross Interleaved Reed Solomon Code) using the reproduced data from the memory 15.

A memory addressing operation here is the same as that of the conventional example. Namely, by sending the memory addresses generated by the write address generation circuit 13 via a second switching circuit 14, the reproduced data is written in the determined order in the memory 15 in cooperation with the operation done by the reproduced data processing circuit 16. Meanwhile, by sending the memory addresses generated by the read address generation circuit 12 via the second switching circuit 14, the error correcting operation and read-out and sending operations of the corrected reproduced data are performed in the determined order in corporation with the operation done by the reproduced data processing circuit 16.

Errors in the reproduced data from the memory 15 is corrected by the reproduced data processing circuit 16. Thereafter, the reproduced data are converted again into an analog audio signal by a D/A converter 18. The converted analog audio signal is either released to an external portion through an external terminal 20 or transferred to the device via an interface 19 which is to be connected to a terminal 21.

The controller 17 is designed so as to receive instructions for reproduction from the host device via the terminal 21 and the interface 19. The controller 17 has an access function by which recognizes a position of the optical head 3 on the disk in response to absolute address information from the address detection circuit 8 and also moves the optical head 3 by utilizing the moving function of an optical head (not shown). Moreover, the controller 17 recognizes sub-code information from the reproduced data processing circuit 16. As stated earlier, it is also provided with a function by which controls a selection by the first switching circuit 10.

Figure 7:
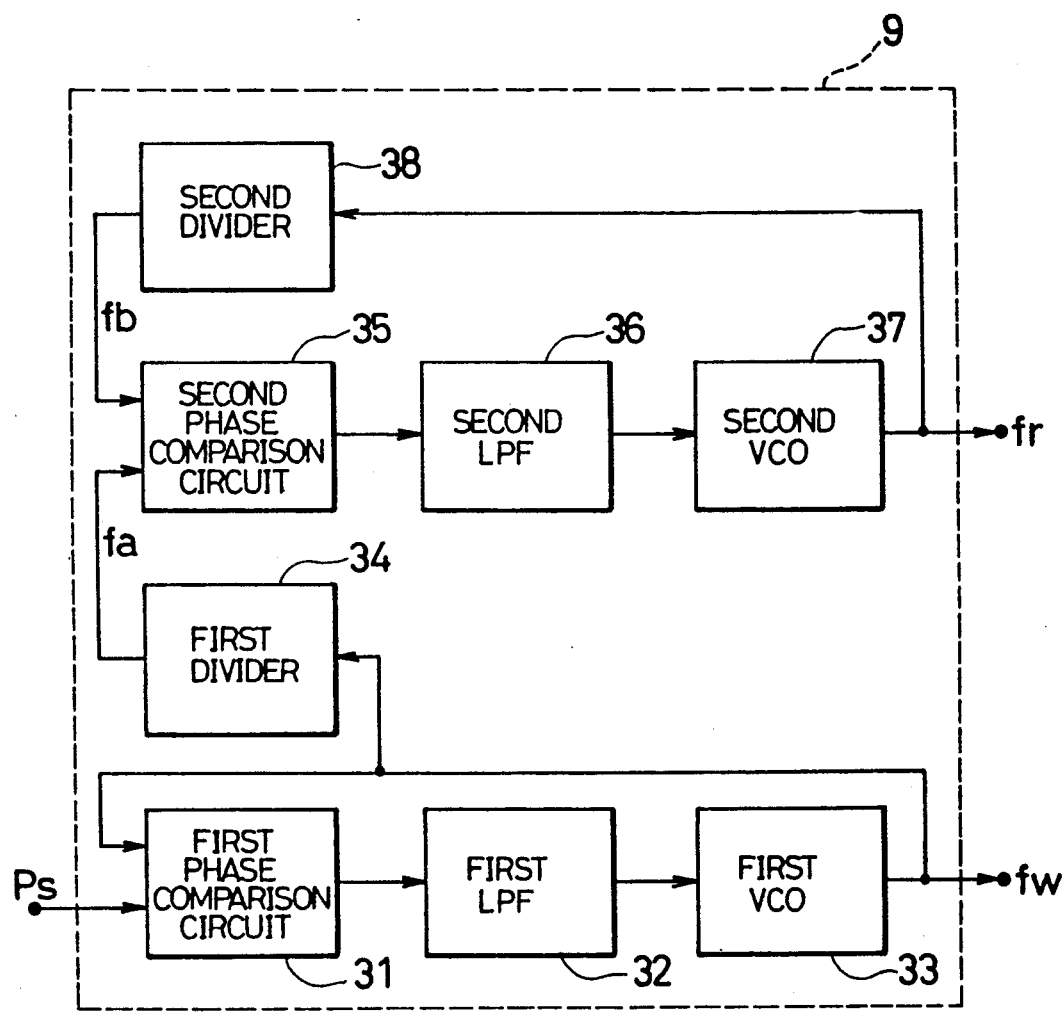
FIG. 7 is a block diagram illustrating a first clock generation circuit provided in the device of FIG. 6.

FIG. 7 is a block diagram explaining the first clock generation circuit 9 for generating the write address generation use clock fw and the read address generation use clock fr in greater detail. The following is an example showing the case of generating the clocks fw and fr whose frequences are different from one another.

In the first clock generation circuit 9, the digital magneto-optical signal Ps from the reproduction amplifier enters the first PLL which is composed of a first phase comparison circuit 31, a first LPS (Low Pass Filter) 32 and a first VCO (Voltage Controlled Oscillator) 33.

The first VCO 33 releases the write address generation use clock fw. The clock fw is sent to the write address generation circuit 13 as described above. Meanwhile, the clock fw is sent to the first phase comparison circuit 31 and a first divider 34 in the first clock generation circuit 9.

In the first phase comparison circuit 31, a difference signal, which varies depending on the phase difference, is generated as a result of making a phase comparison between the digital magneto-optical signal Ps and the write address generation use clock fw. After being leveled by the first LPF 32, the difference signal is supplied as a control voltage for the first VCO 33. Therefore, the write address generation use clock fw becomes a synchronization clock following the digital magneto-optical signal Ps within the range wherein the first clock is locked.

The write address generation use clock fw enters the first divider 34 which divides the frequency of the write address generation clock fw at a ratio of 1/N1 and sends it to a second phase comparison circuit 35 as a clock fa.

The second PLL is composed of the second phase comparison circuit 35, a second LPF 36, a second VCO 37 and a second divider 38.

The read address generation use clock fr (first reading clock) is output from the second VCO 37 and then sent to the first switching circuit 10. Meanwhile, the second divider 38 divides at a ratio of 1/(N2) the frequency of a clock fb having the same frequency as the output clock fa of the first divider 34. Thereafter, the clock fr is sent to the second phase comparison circuit 35.

In the second phase comparison circuit 35, a difference signal is generated by making a phase comparison between the clocks fa and fb. Then, the difference signal is supplied as a control voltage for the second VCO 37 after being leveled in the second LPF 36. Therefore, the read address generation use clock fr is a synchronization signal following the digital magneto-optical signal Ps within the range wherein the first and the second clocks are locked.

More concretely, as the frequency of the write address generation use clock fw (at the determined linear velocity), for example, 4.3218 [MHz] (ninety-eight (98) times of a digital audio information sampling frequency), i.e., the channel bit frequency at the time of the "EFM" modulation for CDs, is selected. As the frequency of the read address generation use clock fr (at the determined linear velocity) and the read address generation use reference clock fr, for example, 4.2336 [MHz] (ninety six (96) times of a digital audio information sampling frequency), which has been widely used in reproduced signal processing LSI of CDs is selected.

In this case, the respective dividing ratio of the first divider 34 and the second divider 38 are 1/98 and 1/96. The frequency of fa and fb to be input to the second phase comparison circuit 35 is 44.1 [NHz], i.e., the digital audio information sampling frequency.

Figure 8:
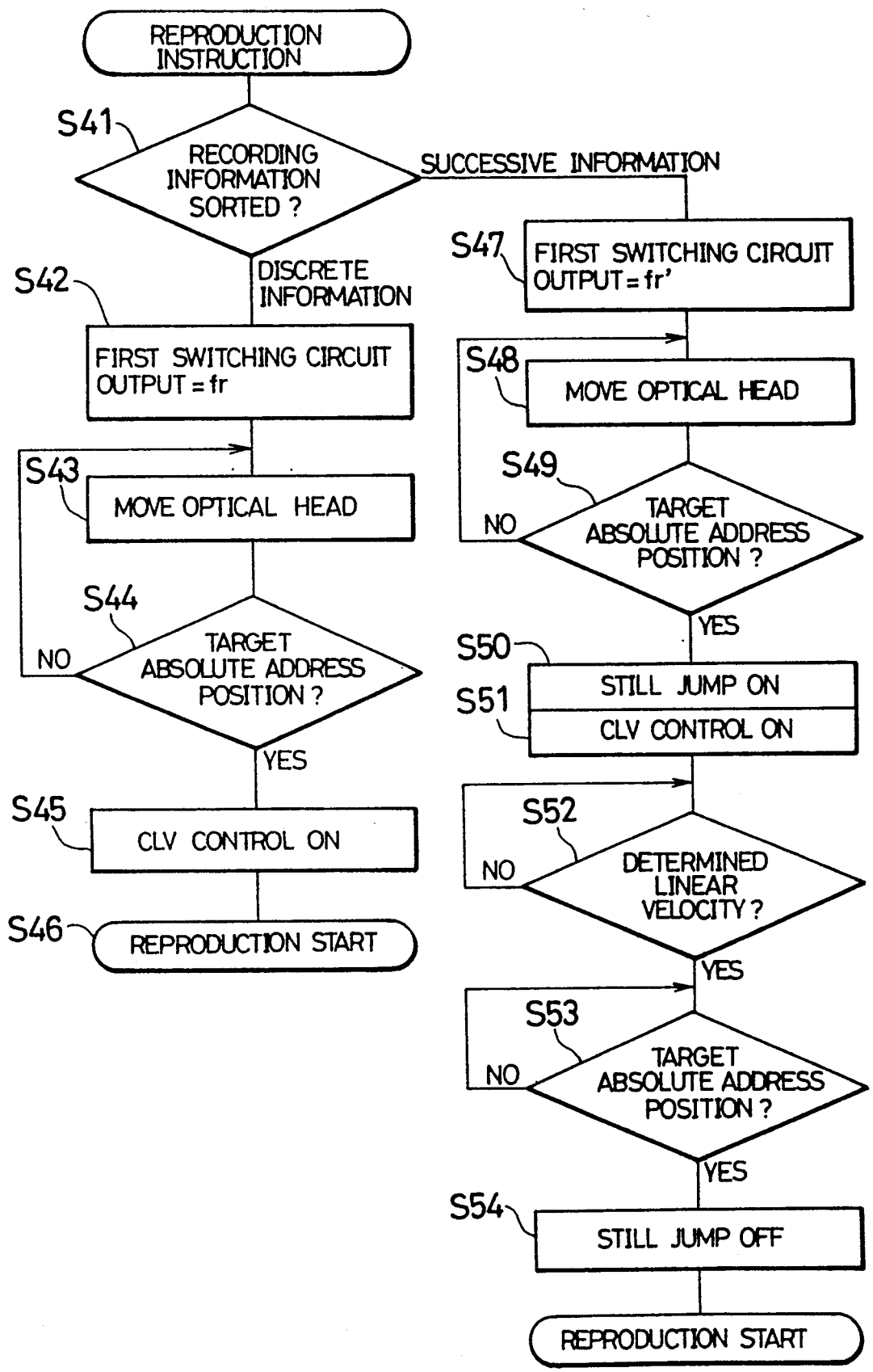
FIG. 8 is a flow chart illustrating a controlling process when reproducing information using the device of FIG. 6.

Next, a control process at the time of an access operation by the controller 17 is discussed in reference to a flow chart in FIG. 8.

When the instructions for reproduction are given from the host device through the terminal 21 and enters the controller 17 via the interface 19, it is first to be determined whether information instructed to be reproduced is audio information like music information (successive information) or information like computer-use data (discrete information) (S 41).

This determination may be made based on the content of the instructions given by the host device. However, it may be also arranged such that the controller 17 itself recognizes using additional sub-code information read out in advance from the TOC area 1a of the magneto-optical disk 1. With this arrangement, the reliability of the reproducing operation can be improved.

When it is determined that the reproducing information is of computer-use data, the selection of a clock in the first switching circuit 10 is made such that the read address generation use clock, to be released to the read address generation circuit 12 from the first switching circuit 10, becomes an output clock fr from the first clock generation circuit 9 (S 42).

Next, the optical head 3 is moved to the reproduction start absolute address position on the disk as instructed (S 43 and S 44). Upon reaching the reproduction start position, the CLV control starts (S 45), and the reproducing operation starts immediately (S 16). Here, for the convenience in explanation, the CLV control starts in S 45; however, the CLV control may start at any time throughout the period before and after the optical head 3 moves.

On the other hand, when it is determined that the reproducing information is of audio information like music information in S 41, the selection of the clock is made such that an output from the first switching circuit 10, i.e., the read address generation use clock, becomes the clock fr' from the second clock generation circuit 11 (S 47).

Then, after S 48 through S 54 in the process similar to the S 31 through S 37 described, the reproducing operation of audio information starts.

Figure 15:
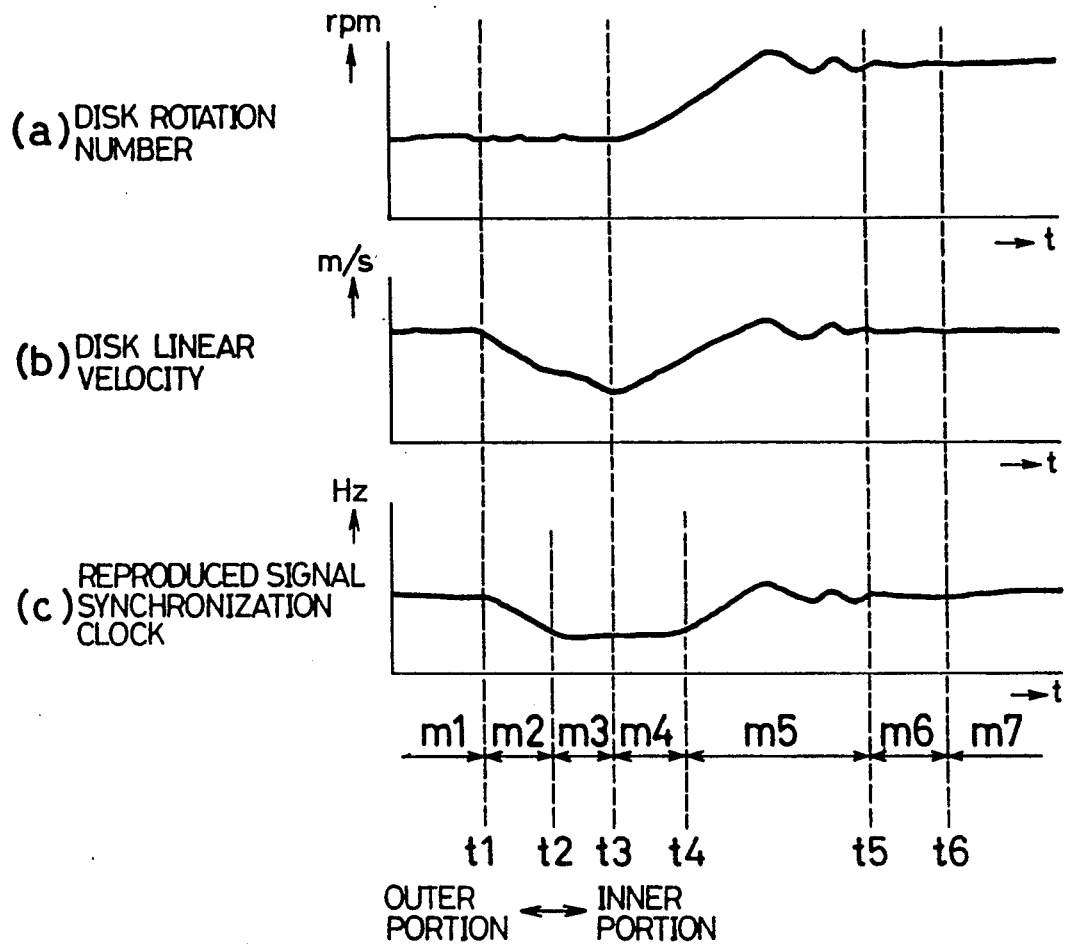
FIG. 15(a)–(c) is a timing chart illustrating an operation state when reproducing information with the CD player.

An operation of executing the process in S 42 through S 46 is discussed referring to FIG. 15 used in the explanation of the conventional example.

Throughout the time intervals m2, m3 and m4, the process is the same as the conventional example. The time interval m2 starts at t1 where instructions for reproduction are received. The time interval m3 ends at t3 where the optical head 3 reaches the target absolute address position. Similarly, the time interval m4 ends at t4 where the clock in synchronization with the reproduced signal is generated. In the present embodiment, however, it is possible to start the reproducing operation at t4.

As for the disk rotation control, the determined number of rotation and the linear velocity have not been obtained at t4 like the conventional model. However, the difference lies in the fact that the read address generation clock fr, which is in synchronization with the magneto-optical signal Ps on the disk generated in the first generation circuit 9, enters the read address generation circuit 12 via the first switching circuit 10, thereby promptly executing the reproducing operation without triggering memory over-flow in spite of the fact that the determined number of rotation/the linear velocity has not been obtained.

In the conventional device, a waiting time for the disk rotation control was required during the time interval m5 which started at t5. The reproducing operation of information started only at t6 after the time interval m6, i.e., the waiting time for the disk rotation. However, with the arrangement of the present embodiment, the described waiting time is not required.

Figure 9:
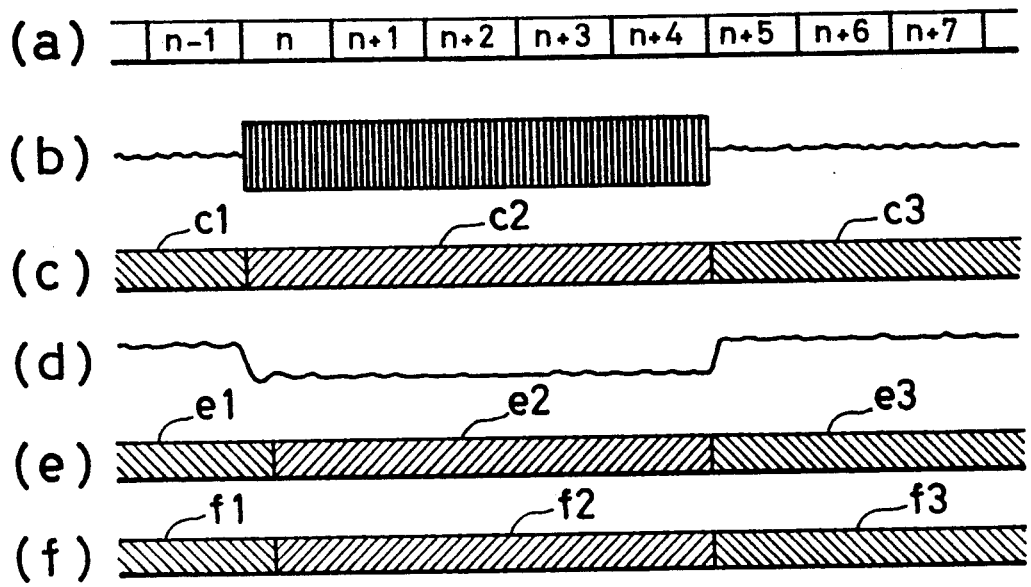
FIG. 9(a)–(f) is a timing chart illustrating a signal state when reproducing information with the device of FIG. 6.
Figure 18:
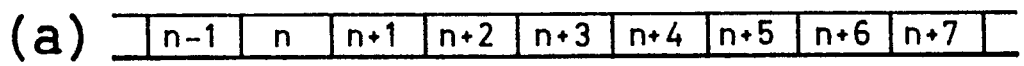
FIG. 18(a)–(f) is a timing chart illustrating a signal state when reproducing information from the magneto-optical disk provided in the conventional reproducing device.
Figure 18:
Figure 18:
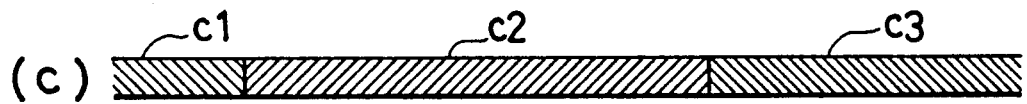
Figure 18:
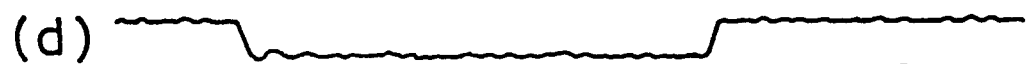
Figure 18:
Figure 18:
Figure 18:
Figure 18:
Figure 18:
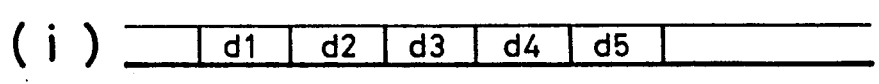

FIG. 9 is a chart showing a reproducing operation of the device in comparison with the conventional example of FIG. 18. Here, those of the signals having the same functions as FIG. 18 used in the conventional example are indicated by the same reference numerals.

FIG. 9 (a) shows a sector line on the disk having the unique absolute address value indicated by pre-recorded information. Information is stored in five sectors from a sector (n) through a sector (n+4). On the other hand, a sector (n−1) and a sector (n+5) through a sector (n+7) represent area whereon no information has been recorded as shown by a reproduced signal (see FIG. 18 (b)).

The comparator in the reproduction amplifier 6 digitalizes the reproduced signal to be a digital magneto-optical signal see FIG. 9 (c). However, in the non-recorded area, i.e., the sector (n−1) and the sector (n+5) through (n+7), the reproduced signal is in a noise level, and thus the corresponding digital magneto-optical signals (c1) and (c3) are meaningless data having high frequencies.

For this reason, in the first clock generation circuit 9, the PLL, for generating the clock in synchronization with the reproduced signal, also generates the clock having a high frequency in the non-recorded area because it follows the digital magneto-optical signal as shown in FIG. 9 (c) (the vertical line in the figure indicates a frequency).

Here, corresponding to the discussed TBC operation, the write address generation use clock (see FIG. 9 (e)) for used in memory writing, becomes a clock in synchronization with the reproduced signal. Thus, in the areas (e1) and (e3), the memory writing is performed using the clock having a high frequency.

However, in this case, the read address generation clock fr in synchronization with the magneto-optical signal Ps on the disk becomes the read address generation use clock as a memory reading clock (see FIG. 9 (f)). As a result, a frequency difference (byte of main information per time unit) between the memory writing clock and the memory reading clock does not occur, thereby preventing the occurrence of the over-flowing phenomenon.

As aforementioned, in the disclosed example of the present embodiment having a high speed access function, the reproducing operation of discrete information such as computer-use data can start promptly without requiring the time for a CLV control when accessing and the following waiting time for a disk rotation until reaching the reproduction start absolute address position like the conventional reproduced data processing device using the CLV controlled recording medium.

With the arrangement of the present invention, the reproducing operation can be performed also from a multimedia recording medium whereon discrete information intermixed with successive information such as music information is recorded. Moreover, when the drive means for moving the optical head is improved for the purpose of achieving still faster access operation, the same effect is obtainable without changing the function of the CLV control system.

In the CLV control system, since the spindle motor and its controlling system do not have to be performed at high speed, the cost of the reproduced data processing device can be lowered. In addition, even when there exists an area whereon no information has been recorded on a recordable disk or a re-writable disk, a highly reliable reproduced data processing can be achieved without having an adverse effect from an unnecessary signal generated by the area.

The above-mentioned embodiment has been discussed on the case of processing the reproduced data from the re-writable magneto-optical disk. However, the present invention is also applicable to the case of processing the reproduced data from a conventional disk of a read only type, i.e., CD-ROM whereon information such as computer-use data is recorded.

The discussed configuration of the present embodiment has a function by which successive information such as music information can be reproduced as well. However, the configuration may be arranged for reproducing only discrete information such as computer-use data or music information which data compression is performed. In this case, the second clock generation circuit 11 for generating read address generation use clock fr' and the first switching circuit 10 are not required. The form of the absolute addresses is not restricted as long as recognizable when it was previously recorded.

In the above embodiment, the disk-shaped recording medium of the magneto-optical system is employed. However, other re-writable type recording media or once re-writable type recording media may be employed as well. In addition, the recording medium is not restricted to the disc-shaped recording media, card-shaped ones may be used as well, as long as they do not depart from the scope of the present invention.

As aforementioned, an information recording and reproducing device of the present invention wherein reproduced data is written in memory means by using a writing clock in synchronization with the reproduced data from a recording medium, is provided with first clock generation means for generating a first reading clock in synchronization with the reproduced data as a reading clock for reading out the reproduced data from the memory means.

With this arrangement, it is possible to start the reproducing operation immediately after the optical head has been moved before the determined linear velocity is obtained. While with the conventional device, even after the optical head has been moved, the reproducing operation could not start until the determined linear velocity was obtained through a disk rotation control. Thus, this arrangement enables a still faster access operation. Further, since writing and read-out operations are performed using clocks in synchronization with the reproduced data, over-flow in the memory means can be restrained, thereby improving the reliability of the reproducing operation.

The information recording and reproducing device of the present invention having the described configuration may further include: second clock generation means for generating a second reading clock having a reference frequency; switching means for alternatively selecting either the first reading clock or the second reading clock as a reading clock; and switch controlling means for controlling a selection by the switching means based on distinctive information which determines whether information recorded on a determined area of the recording medium is successive or discrete.

With this arrangement, when dealing with discrete information such as computer-use data, the access operation is promptly carried out; while, when dealing with successive information such as music information, by means of the TBC operation, the reproducing operation without having a time based deviation can be ensured like the conventional example. As a result, a highly reliable reproducing operation can be achieved for both types of information.

The present invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. An information recording and reproducing device employing a recording medium having pre-recorded information formed thereon, said pre-recorded information including rotation control information for controlling a rotation of said recording medium at a predetermined constant linear velocity, said device comprising:
    optical head means for recording and reproducing information on and from said recording medium,
    rotation control means for controlling by CLV control the linear velocity of the recording medium relative to the optical head means;
    first recording clock generation means for generating a first recording clock for signal processing in a recording mode based on the pre-recorded information of reproduced signal on said recording medium and on the actual linear velocity of the recording medium when said optical head means reaches a target recording portion on said recording medium, said first recording clock having a frequency which is proportional to said actual linear velocity which said recording medium acquires when said optical head means reaches a target recording portion on said recording medium,
    wherein the recording mode is carried out in accordance with said first recording clock just after said optical head means reaches the target recording portion.

2. An information recording and reproducing device as set forth in claim 1, further comprising:
    second recording clock generation means for generating a second recording clock having a determined reference frequency;
    switching means for alternatively selecting either the first recording clock when recorded information is discrete or the second recording clock when recorded information is continuous; and
    control means for controlling a switching operation of said switching means based on distinctive information stored in a determined area of the recording medium, which distinctive information determines whether recorded information is continuous or discrete.

3. The information recording and reproducing device as set forth in claim 1, and further including a phase-locked loop circuit means, and further wherein said first recording clock generation means is designed so as to output a recording clock signal, said phase-locked loop circuit means synchronizing the clock signal with the pre-recorded information.

4. The information recording and reproducing device as set forth in claim 2, wherein said second recording clock generation means is designed so as to output a recording clock signal having a reference frequency based on the constant linear velocity.

5. An information recording and reproducing device employing a disk recording medium having pre-recorded information formed thereon, said pre-recorded information including rotation control information for controlling a disk rotation at a predetermined constant linear velocity, comprising:
    an optical head means for recording and reproducing information on said medium;
    rotation control means for controlling by CLV control the linear velocity of the recording medium relative to the optical head means;
    first recording clock generation means for generating a first recording clock for signal processing in a recording mode, which processing is performed at an actual linear velocity of the recording medium just after said optical head means reaches a target recording portion and is in synchronization with the pre-recorded information and for outputting digital pre-recorded information;
    second recording clock generation means for generating a second recording clock having a frequency which is responsive to the predetermined constant linear velocity;
    means for detecting a present address of the optical head means based on the digital pre-recorded information;

switching means for alternatively selecting either the first recording clock or the second recording clock; and control means for controlling a switching operation based on distinctive information which determines whether information recorded on the recording medium is continuous or discrete and for starting the recording operation after detecting that the optical head means has reached a target address based on an output from the present address detection means.

6. The information recording and reproducing device as set forth in claim 5, wherein said first recording clock generation means comprises:

filter means for separating the pre-recorded information from the reproduced signal;

means for digitizing the pre-recorded information thus separated;

phase-locked loop circuit means responsive to the digital pre-recorded information for outputting the first recording clock which is in synchronization with the digital pre-recorded information.

7. The information recording and reproducing device as set forth in claim 5, wherein said second recording clock generation means comprises:

reference clock generation means, which generates a clock signal having a frequency in response to the linear velocity which is controlled by said rotation control information; and dividing means for dividing the frequency of the clock signal from said reference clock generation means.

8. The information recording and reproducing device as set forth in claim 5, wherein said present address detecting means comprises a biphase-mark demodulator for demodulating, in the form of a "biphase-mark", the pre-recorded information extracted by the first recording clock generation means, and a address decoder for decoding the demodulated pre-recorded information to provide address information indicating positions on the recording medium.

9. A method for recording information on a recording medium having pre-recorded information formed thereon, said pre-recorded information including rotation control information for controlling a rotation of said medium at a constant linear velocity, comprising the steps of:

(a) determining whether information to be recorded is analog information or digital information;

(b) moving an optical head means to a target address;

(c) controlling by CLV control the linear velocity of the recording medium relative to the optical head;

(d) determining whether or not the optical head means has reached the target address by detecting a present address of the optical head means;

(e) generating a first recording clock in synchronism with the pre-recorded information, said first reading clock having a frequency which is proportional to an actual linear velocity which said recording medium acquires when said optical head means reaches said target address;

(f) generating a second recording clock having a determined reference frequency;

(f) recording by using the second recording clock in the case of analog information, immediately after determining that the optical head means has reached the target address; and (h) recording by using the first recording clock in the case of digital information, immediately after determining that the optical head means has reached the target address.

10. An information recording and reproducing device having memory means for storing reproduced data for the purpose of absorbing a time based deviation of the reproduced data from a recording medium, wherein the reproduced data is written in the memory means using a writing clock in synchronization with the reproduced data from the recording medium, comprising:

an optical head means for recording and reproducing information on said recording medium;

rotation control means for controlling by CLV control the linear velocity of the recording medium relative to the optical head means;

first reading clock generation means for generating a first reading clock in synchronization with the reproduced data as a reading clock, said first reading clock having a frequency which is proportional to an actual linear velocity which said recording medium acquires when said optical head means reaches a target reproducing portion of said medium, wherein the reproduced data is read out from the memory means according to the first reading clock.

11. The information recording and reproducing device as set forth in claim 10, further comprising:

second reading clock generation means for generating a second reading clock having a determined reference frequency;

switching means for alternatively selecting either the first reading clock or the second reading clock as the reading clock; and reading clock switch controlling means for controlling a switching operation of the switching means based on distinctive information which determines whether information recorded in a determined area on the recording medium is continuous or discrete.

12. An information recording and reproducing device having memory means for storing reproduced data which includes pre-recorded information for the purpose of absorbing a time based deviation of the reproduced data from a recording medium, wherein the reproduced data is written in the memory means using a writing clock in synchronization with the reproduced data from the recording medium, comprising:

optical head means for recording and reproducing information on said recording medium;

rotation control means for controlling by CLV control the linear velocity of the recording medium relative to the optical head means;

means for amplifying and digitizing the reproduced data from said optical head means and for outputting a digital reproduced signal therefrom;

pre-recorded information detection means for extracting the pre-recorded information from the digital reproduced signal;

address detection means for detecting a present position of the optical head means based on the pre-recorded information thus extracted;

first reading clock generation means for generating a first reading clock in synchronization with the reproduced data as a reading clock, said first reading clock having a frequency which is proportional to an actual linear velocity which said recording medium acquires when said optical head means reaches a target reproducing portion of said medium, said first reading clock being used for reading out the reproduced data from the memory means;

second reading clock generation means for generating a second reading clock having a determined reference frequency;

switching means for alternatively selecting either the first reading clock or the second reading clock as the reading clock; and control means for controlling a switching operation of said switching means based on distinctive information which determines whether information recorded on a determined area of the recording medium is successive or discrete.

13. The information recording and reproducing device as set forth in claim 12, wherein said first reading clock generation means comprises:

a first phase-locked loop circuit means for outputting a write address clock based on the pre-recorded digital information from said amplifying and digitizing means;

dividing means for dividing the frequency of the write address clock; and a second phase-locked loop circuit means for outputting a read address clock based on an output from said dividing means.

14. A method for reproducing information recorded on a recording medium having pre-recorded information formed thereon, said pre-recorded information including rotation control information which is used to control a rotation to be reproduced at a predetermined constant linear velocity, comprising the steps of:

(a) determining whether recorded information to be reproduced is analog information or digital information;

(b) moving an optical head means to a target address;

(c) controlling by CLV control the linear velocity of the recording medium relative to the optical head;

(d) determining whether or not the optical head means has reached the target address by detecting a present address of the optical head means;

(e) generating a first reference clock in synchronization with the pre-recorded information, said first reading clock having a frequency which is proportional to an actual linear velocity which said recording medium acquires when said optical head means reaches said target address;

(f) generating a second reference clock having a determined reference frequency;

(g) reproducing by using the second reading clock in the case of analog information, immediately after determining that the optical head means has reached the target address; and (h) reproducing by using the first reading clock in the case of digital information, immediately after determining that the optical head means has reached the target address.

* * * * *